United States Patent
Horn et al.

(10) Patent No.: US 7,028,297 B2
(45) Date of Patent: Apr. 11, 2006

(54) SYSTEM AND METHOD OF SCALABLE TRANSACTION PROCESSING

(75) Inventors: Robert L. Horn, Yorba Linda, CA (US); Virgil V. Wilkins, Perris, CA (US); Mark D. Myran, Aliso Viejo, CA (US); David S. Walls, Aliso Viejo, CA (US); Gnanashanmugam Elumalai, Irvine, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 88 days.

(21) Appl. No.: 10/429,048

(22) Filed: May 5, 2003

(65) Prior Publication Data

US 2003/0195918 A1    Oct. 16, 2003

Related U.S. Application Data

(63) Continuation-in-part of application No. 09/739,354, filed on Dec. 15, 2000, now abandoned.

(60) Provisional application No. 60/252,839, filed on Nov. 17, 2000.

(51) Int. Cl.
*G06F 9/46* (2006.01)
*G06F 7/00* (2006.01)

(52) U.S. Cl. .......................... 718/100; 718/102; 707/1; 707/100

(58) Field of Classification Search ................ 718/100, 718/102, 104–196; 709/200–203; 707/1–2, 707/100
See application file for complete search history.

(56) References Cited

U.S. PATENT DOCUMENTS

| 4,819,159 | A | | 4/1989 | Shipley et al. | |
|---|---|---|---|---|---|
| 4,925,311 | A | * | 5/1990 | Neches et al. | 718/100 |
| 5,504,900 | A | * | 4/1996 | Raz | 707/10 |
| 5,581,729 | A | | 12/1996 | Nishtala et al. | |
| 5,706,511 | A | | 1/1998 | Tomoda | |
| 6,058,267 | A | | 5/2000 | Kanai et al. | |
| 6,065,096 | A | | 5/2000 | Day et al. | |
| 6,173,306 | B1 | * | 1/2001 | Raz et al. | 718/102 |
| 6,219,689 | B1 | | 4/2001 | Mori | |
| 6,546,459 | B1 | | 4/2003 | Rust et al. | |

* cited by examiner

*Primary Examiner*—Meng-Al T. An
*Assistant Examiner*—Syed J Ali
(74) *Attorney, Agent, or Firm*—Dickstein Shapiro Morin & Oshinsky LLP

(57) ABSTRACT

A transaction processor pipeline architecture and associated apparatus for processing multiple queued transaction requests incorporates multiple processing elements working in parallel. Each processing element is configured to perform a specific function within the transaction processor system. Certain processing elements are assigned as function controllers, which are assigned to process specific transaction request subtask categories and may be augmented with dedicated hardware to accelerate certain subtask functions. Other processing elements are configured as list managers, which are optimized for managing data structure operations in memory. The processing elements are connected by a cross-point interconnect. The transaction processor system is configurable and scalable based on application needs.

24 Claims, 20 Drawing Sheets

SYSTEM AND METHOD OF SCALABLE TRANSACTION PROCESSING

This is a continuation-in-part of U.S. Ser. No. 09/739,354, filed on Dec. 15, 2000 (now abandoned), which claims the benefit of U.S. Provisional Application No. 60/252,839, filed Nov. 17, 2000. The disclosures of these prior filed applications are herein incorporated by reference.

FIELD OF INVENTION

The present invention relates to parallel processing of transaction requests, and more specifically to parallel processing of transaction requests through a scalable pipelined architecture.

BACKGROUND OF THE INVENTION

In conventional transaction processing systems, transaction requests are processed on general-purpose processing hardware that executes software or firmware. Each transaction request may include multiple, sequential subtasks that must be completed sequentially to process the task as a whole. These subtasks in turn include discrete operational elements, such as compute or memory access functions. As each task is received, the conventional transaction processing system processes each subtask sequentially by performing the operations instructed by the first subtask, then the second, and so on. These operations may include reading or writing data, storing or loading operands, performing logical computations, manipulating data structures, or branching to a different set of instructions altogether. In most inefficient architectures, the transaction processor is fully dedicated to a given transaction request, therefore the subtasks of each transaction request are completed in sequence regardless of processor idle time. Some transaction processors may begin to process the next transaction request while waiting for results from the current transaction request subtask. For example, the current transaction request subtask may include an external device read instruction. After the processor makes the read request using the correct protocol, it waits for the requested read data to arrive. While the processor is waiting, it is free to begin the processing of a subtask from a different transaction request. This involves the processor storing current data, state information, and status to memory then loading the new subtask instructions into its registers. The processor begins to process the new subtask until the data arrives from the previous subtask request. At that point, the processor can proceed to the next subtask of the original transaction request. The ability to switch between subtasks of different transaction requests allows a more efficient use of processor cycles; however, the sequential nature of the task processing fundamentally limits throughput.

With the explosive growth of the use of digital data and networking, the numbers of transactions that transaction processing systems are required to handle per unit of time has significantly increased. This growth has outpaced the advances in processor speeds, such that the performance of conventional transaction processing does not meet the market demand. As transaction volumes increase, the traditional model of sequential processing, even with the ability to swap subtasks while waiting for results, is increasingly becoming a limiting process. One solution has been to provide a transaction processing system with more than one processor. However, each processor still requires overhead to swap the tasks or subtasks to which it is assigned. This technique does not relieve the need for additional overhead consumed by subtask swapping. Subtasks must usually be processed sequentially in order to maintain the integrity of the overall task. Parallel processing of subtasks may mean that subtasks are processed out of order. Therefore, typical parallel processing must use additional overhead to ensure orderly completion of subtasks.

U.S. Pat. No. 6,219,689, entitled, "Parallel transaction processing system," describes a parallel transaction processing system that performs efficient parallel processing of multiple tasks and includes a queue for storing a plurality of transaction data that can be processed independently, a control table containing control information for the queue, and a means for operating a plurality of tasks that performs the same processing on the transaction data stored in the queue. A corresponding parallel transaction processing method includes the steps of: storing a plurality of transaction data in a queue that can be processed independently, providing a control table containing control information for the queue, and operating a plurality of tasks that perform the same processing on the transaction data stored in the queue. Each of the operated tasks reserves a predetermined number of consecutive transaction data for processing among unprocessed transaction data stored in the queue by referencing the control table, writes its reservation status in the control table and, upon having processed the reserved transaction data, writes its processing status in the control table.

Although the system described in patent '689 provides a method for parallel processing of multiple tasks, it fails to provide a method for processing the subtasks in order without unacceptable overhead. The system described in patent '689 also fails to provide a scalable architecture that can be easily expanded when more processing power is needed. It also is not flexible enough to be incorporated into systems with different transaction types.

Therefore, it is an object of the present invention to provide significantly increased performance in a transaction processor system. It is another object of this invention to enable more complex transactions in the same amount of processing time. It is yet another object of this invention to provide a scalable transaction processor architecture that can be leveraged across many different transaction types and speeds. It is yet another object of this invention to make swapping process control between subtasks more efficient. It is yet another object of this invention to provide a method that manages process control in such a way that maintains transaction integrity.

SUMMARY OF THE INVENTION

The present invention is directed to a transaction processor pipeline architecture and associated apparatus for processing multiple queued transaction requests which incorporates multiple processing elements working in parallel. Each processing element is configured to perform a specific function within the transaction processor system. Certain processing elements are assigned as function controllers, which process specific transaction request subtask categories and may be augmented with dedicated hardware to accelerate certain subtask functions. Other processing elements are configured as list managers, which are optimized for managing data structure operations in memory. The processing elements are connected by a cross-point interconnect. The transaction processor system is configurable and scalable based on application needs.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE PREFERRED EMBODIMENTS

The present invention is a parallel transaction processor architecture and an associated apparatus. Specifically, the architecture and apparatus support the processing of multiple transaction requests and their associated subtasks in a parallel pipelined fashion, with individual processing elements assigned to specific subtask categories.

Figure 1A:
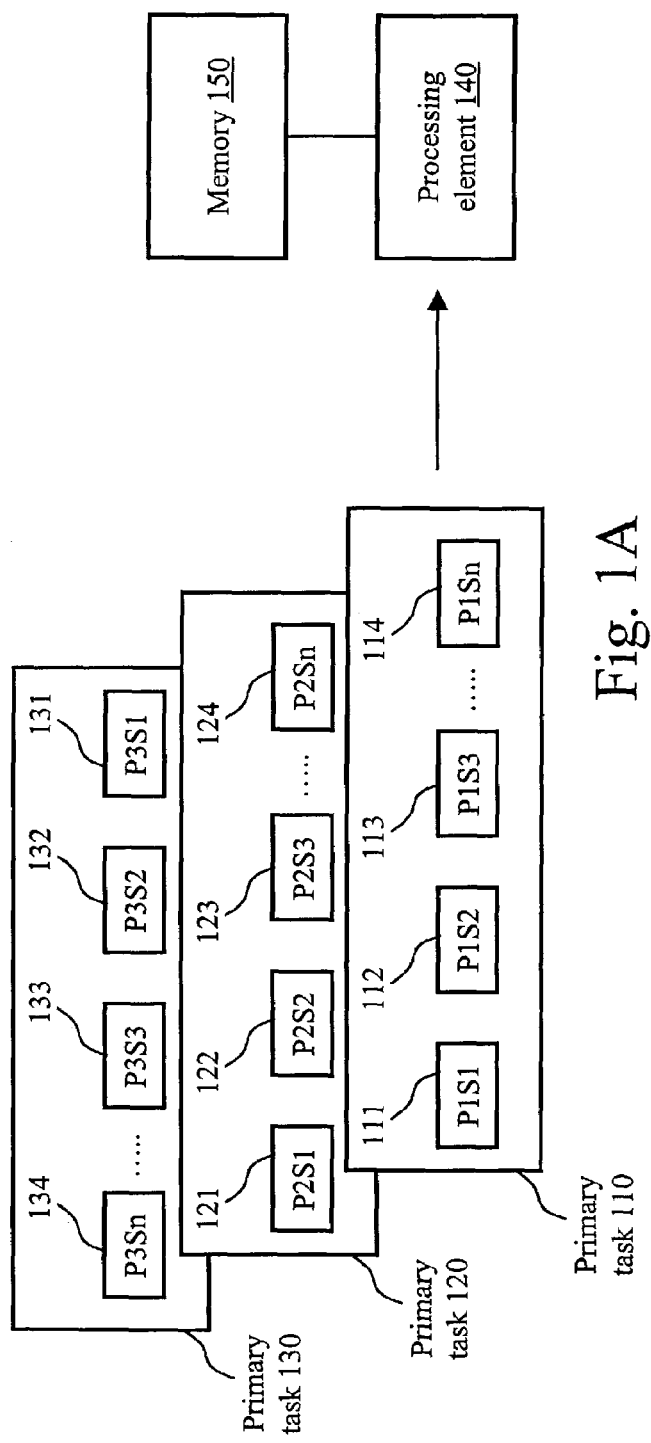
FIG. 1A is a diagram of a conventional high-level conventional transaction processor system with a single processing element connected to a single memory source.

Referring now to the drawings, where like reference numerals designate like elements, there is shown in FIG. 1A a diagram of conventional transaction processing, including a primary task 110, a primary task 120, a primary task 130, a processing element 140, and a memory 150. Primary task 110 is further divided into a subtask P1S1 111, a subtask P1S2 112, a subtask P1S3 113, and a subtask P1Sn 114. Primary task 120 is further divided into a subtask P2S1 121, a subtask P2S2 122, a subtask P2S3 123, and a subtask P2Sn 124. Primary task 130 is further divided into a subtask P3S1 131, a subtask P3S2 132, a subtask P3S3 133, and a subtask P3Sn 134. Primary task 110, primary task 120, and primary task 130 are tasks to be processed by processing element 140. Processing element 140 works on P1S1 111 of primary task 110 first. The subtasks for each primary task 110 must be completed in order. In other words, P1S1 111 must be completed before processing on P1S2 112 begins, P1S2 112 must be completed before processing on P1S3 113 begins, and so on. However, the completion of a subtask, for example P1S2 112, may require waiting for a response from an external process (not shown). Since subtask P1S2 112 must be completed before processing of subtask P1S3 113 may commence, processing element 140 is free to begin processing another subtask from a different primary task, for example, P2S1 121. While the processing of subtasks within a primary task is sequentially dependent, no such relationship exists between primary tasks, so that the processing of primary task 110, primary task 120, and primary task 130 do not necessarily need to be completed in their queue order; for example, primary task 130 may be completed before primary task 110 is completed.

Figure 1B:
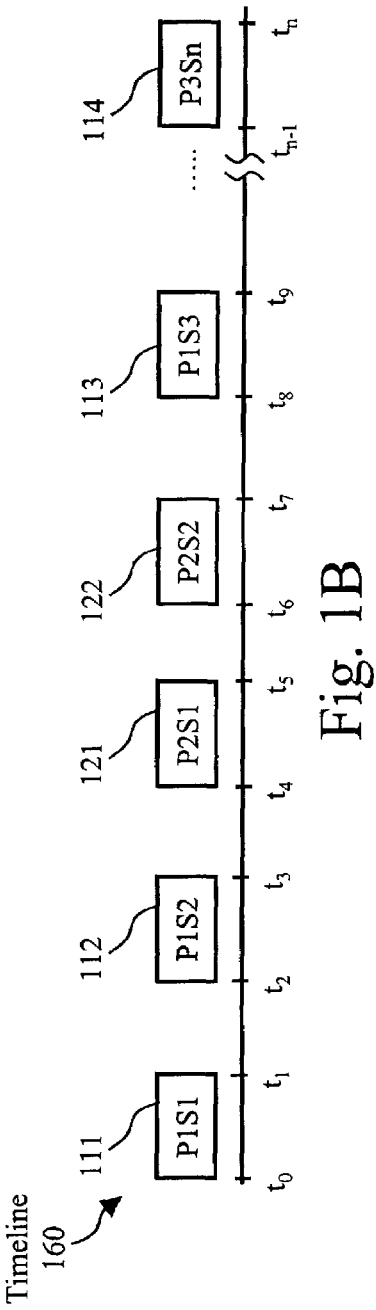
FIG. 1B is a timeline of the throughput for a conventional transaction processor.

Processing element 140 is a serial processor: it can only process one subtask at a time. Although it may process another subtask while waiting for results to return from a previous operation, processing element 140 must first store the contents of its registers in memory for the current subtask before loading the operands for the new subtask. This switching context consumes processing power and takes time. The throughput results of processing element 140 can be seen in FIG. 1B as a timeline 160. Timeline 160 is an example representation of the processing timeline inside processing element 140. In this example, processing element 140 processes subtask P1S1 111 and therefore P1S1 111 is the first completed operation. Next, P1S2 112 is completed, then P2S1 121 and so on. Since processing element 140 is processing each subtask of each primary task serially, the total amount of time spent on processing all of the primary tasks is equal to the sum of times spent processing each subtask.

Figure 2A:
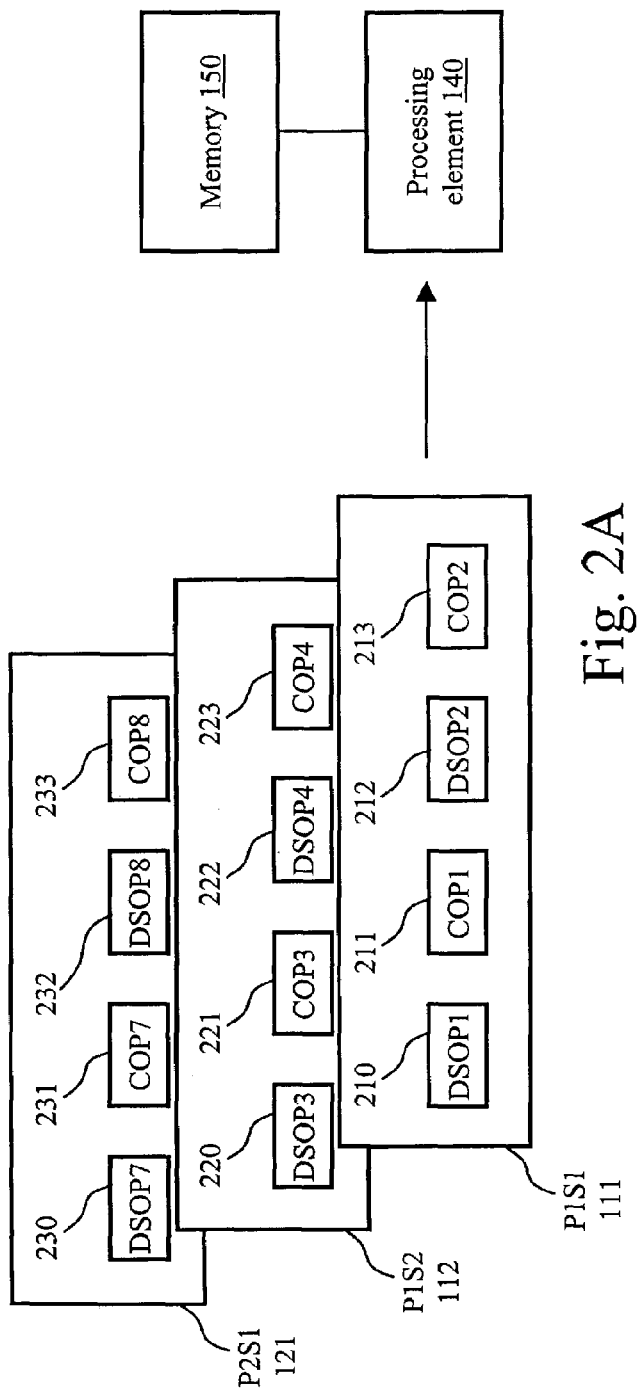
FIG. 2A is a diagram of a conventional high-level system using a transaction processor in which the subtasks to be processed are broken down into compute and data structure operations.

FIG. 2A shows a detailed view of P1S1 111. P1S1 111 further includes a series of compute and data structure operations. In this example, P1S1 111 includes a data structure operation (DSOP) DSOP1 210, a compute operation (COP) COP1 211, a DSOP2 212, and a COP2 213. P1S2 112 further includes a DSOP3 220, a COP3 221, a DSOP4 222, and a COP4 223. P2S1 121 further includes a DSOP7 230, a COP7 231, a DSOP8 232, and a COP8 233. A data structure operation involves manipulating a list or lists in memory. Data structure operations are therefore memory intensive operations that require memory 150 access. Some example data structure operations include: GetField(s), PutField(s), Move, Unlink, Link, Inc/DecField, and ScanList.

Processing element 140 may not process COP2 213 until DSOP2 212 is completed. Therefore, processing element 140 is idle during memory 150 access times. Memory 150 may only process one memory access at a time, constituting a bottleneck in memory 150. On the other hand, a compute operation requires very little memory 150 access and instead requires more processing element 140 cycles. Compute operations are a type of computation, such as add, shift, logical compare, etc. Therefore, compute operations take more processing time and thus create throughput bottleneck issues in processing element 140.

Figure 2B:
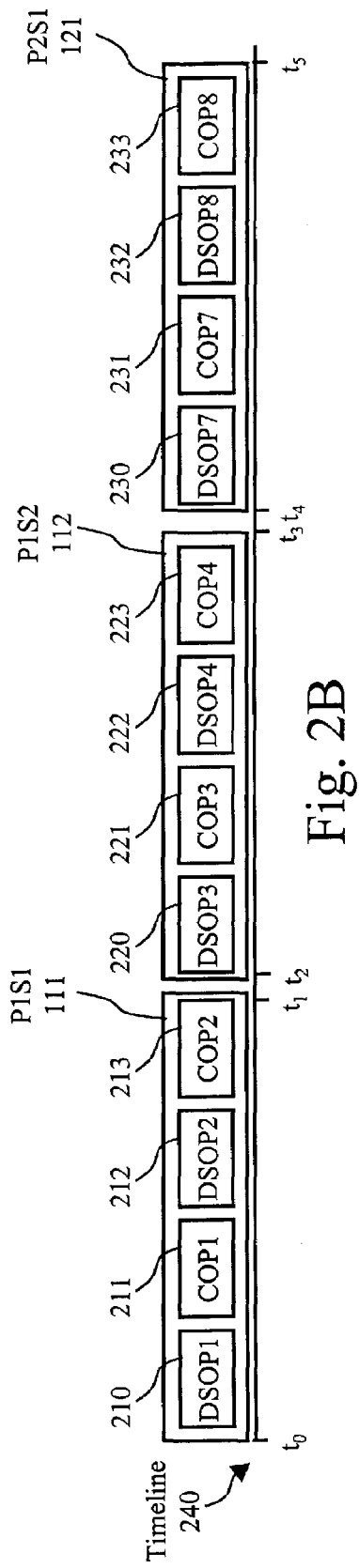
FIG. 2B is a timeline of the conventional transaction processor throughput including the compute and data structure operation subtasks.

FIG. 2B shows subtask P1S1 111 broken down into its task elements in a timeline 240. Here DSOP1 210 is executed to completion by processing element 140 before processing COP1 211. Since DSOP1 210 is a data structure operation, it requires access to memory 150. Processing element 140 waits for the data to return from memory 150 before processing COP1 211. At this level of task granularity, processing element 140 is dedicated to completing subtask P1S1 111 task elements in sequence. DSOP2 212 may not be started until COP1 211 has completed and freed processing element 140. Next, processing element 140 processes DSOP2 212 to completion before processing COP2 213. At time $t_1$, processing element 140 has completed P1S1 111 in its entirety. At time $t_2$, processing then moves on to P1S2 112 where processing element 140 first executes DSOP3 220 then COP3 221, then DSOP4 222, and finally, completes COP4 223 at time $t_3$. At time $t_3$, processing element 140 has completed P1S2 112. At time $t_4$, processing element 140 begins processing DSOP7 230 of P2S1 121. Once completed, processing element 140 continues to process COP7 231, then DSOP8 232; finally, processing element 140 completes COP8 233 at time $t_5$, ending the processing of P2S1 121. In this manner, processing element 140 processes and completes all operations in sequential fashion. The throughput of processing element 140 may be very slow due to idle times during data structure operations (waiting for memory 150 access) and processor intensive compute cycle times during compute operations.

Figure 3:
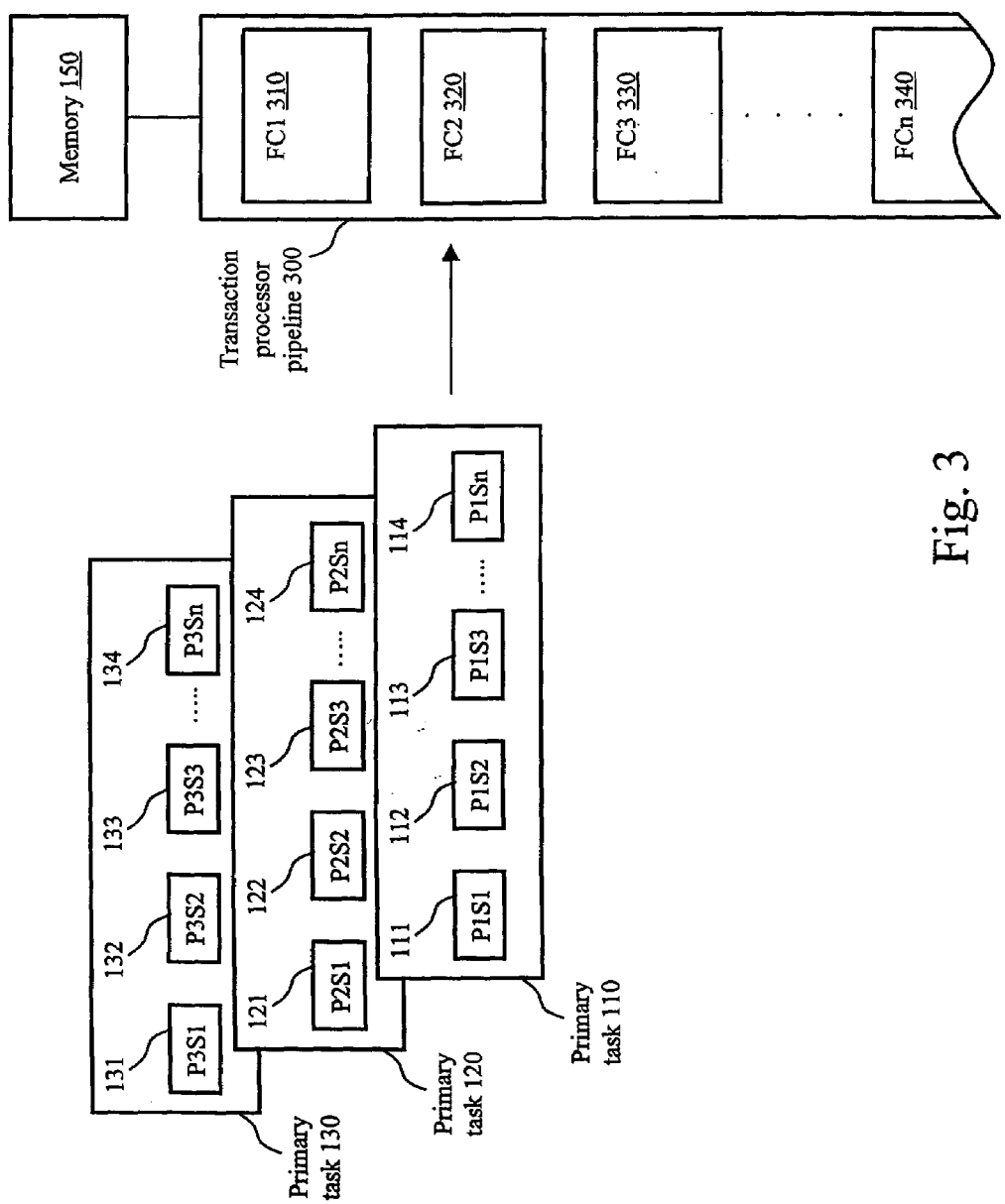
FIG. 3 illustrates a first embodiment of a transaction processor system of the present invention with multiple function controllers operating in parallel.

FIG. 3 shows one embodiment of the present invention that transforms the conventional serial process described in FIG. 2 into a parallel process using a transaction processor pipeline 300. Transaction processor pipeline 300 includes a function controller 1 (FC1) 310, a function controller 2 (FC2) 320, a function controller 3 (FC3) 330, and a function controller n (FCn) 340. For simplicity, only four function controllers are represented in FIG. 3; however, any number of function controllers may be incorporated into transaction processor pipeline 300. In transaction processor pipeline 300, all category 1 subtasks are assigned to FC1 310, all category 2 subtasks are assigned to FC2 320, all category 3 subtasks are assigned to FC3 330, and so on. In the previous figures, all PXS1 subtasks are category 1 subtasks, all PXS2 subtasks are category 2 subtasks, all PXS3 subtasks are category 3 subtasks, and so on.

Figure 4:
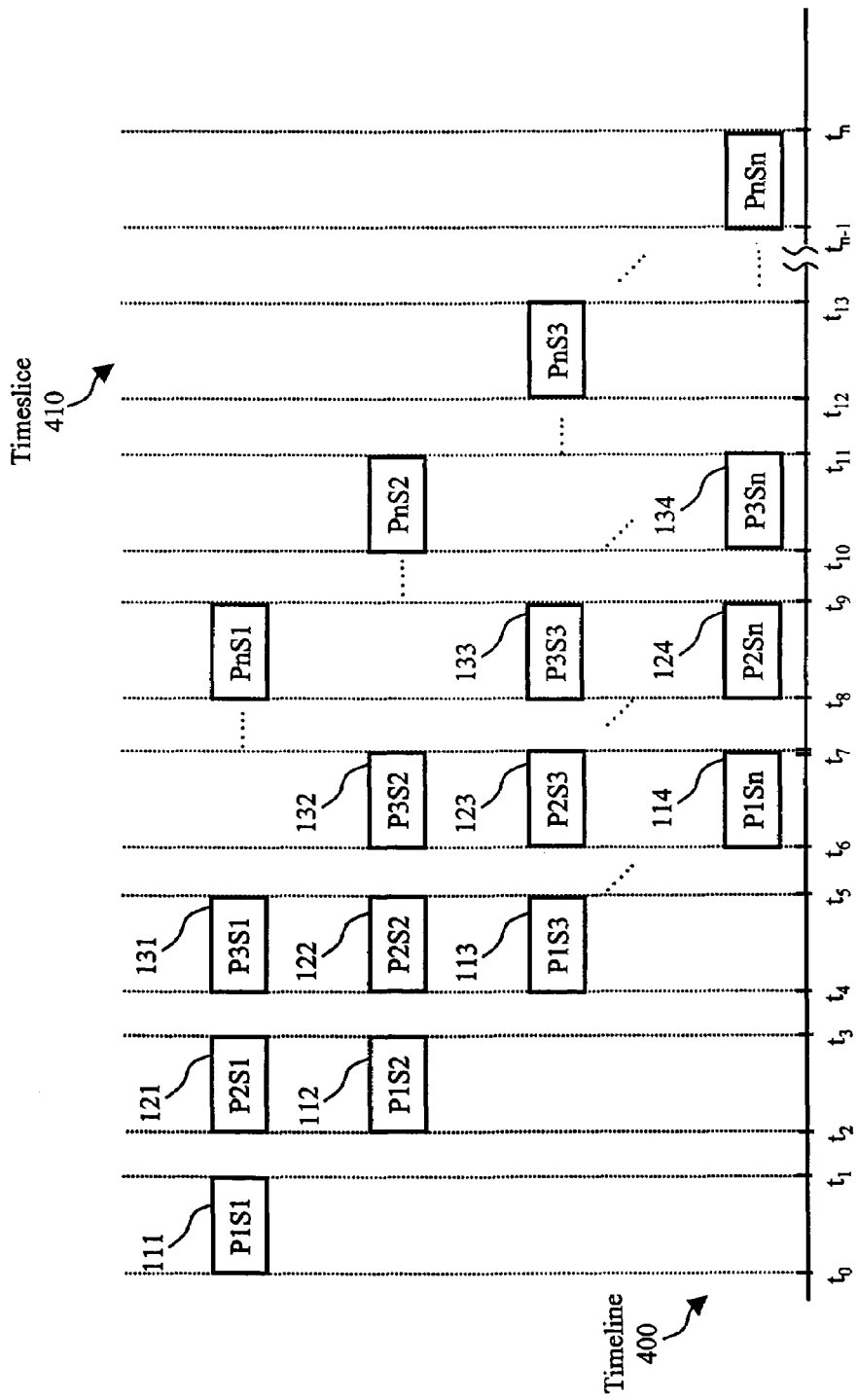
FIG. 4 is a timeline of the pipelined processor throughput.

With reference to a timeline 400 in FIG. 4, the throughput of transaction processor pipeline 300 is greater than that of the conventional system shown in FIG. 1 because the subtasks are performed in a parallel pipeline rather than sequentially through a single processor. Because of the addition of multiple function controllers, each subtask category now has a dedicated function controller. For simplicity, the primary tasks are defined as consisting of the same sequence of subtasks; that is, P1S1 111 is in the same task category as P2S1 121. Further, in this example, each subtask has a corresponding dedicated function controller. That is to say, P1S1 111 is processed by FC1 310, P1S2 112 is processed by FC2 320, P1S3 113 is processed by FC3 330, and so on. At $t_0$, FC1 310 processes P1S1 111. At $t_1$, P1S1 111 is complete and FC2 320 may now process P1S2 112 while FC1 310 processes the next category 1 subtask, P2S1 121, at time $t_2$. At time $t_1$, FC1 310 performs administrative functions requiring a small number of processing cycles, which are completed by time $t_2$. Similar inter-processing cycles are shown being performed by the function controllers between each subtask; however, they may or may not always be necessary. The function controllers continue to process the subtasks for each primary task. In this illustrative example, processing is complete after P3S3 133 completes; however, it would be obvious to those skilled in the art that processing may continue indefinitely, depending on the number of primary tasks and subtasks that need to be processed. This configuration significantly increases transaction processing throughput by processing subtasks in parallel rather than in serial; however, this configuration aggravates the memory 150 bottleneck issue described in FIG. 2A. This is further illustrated by taking a closer look at the compute and data structure operations that make up each subtask.

Figure 5:
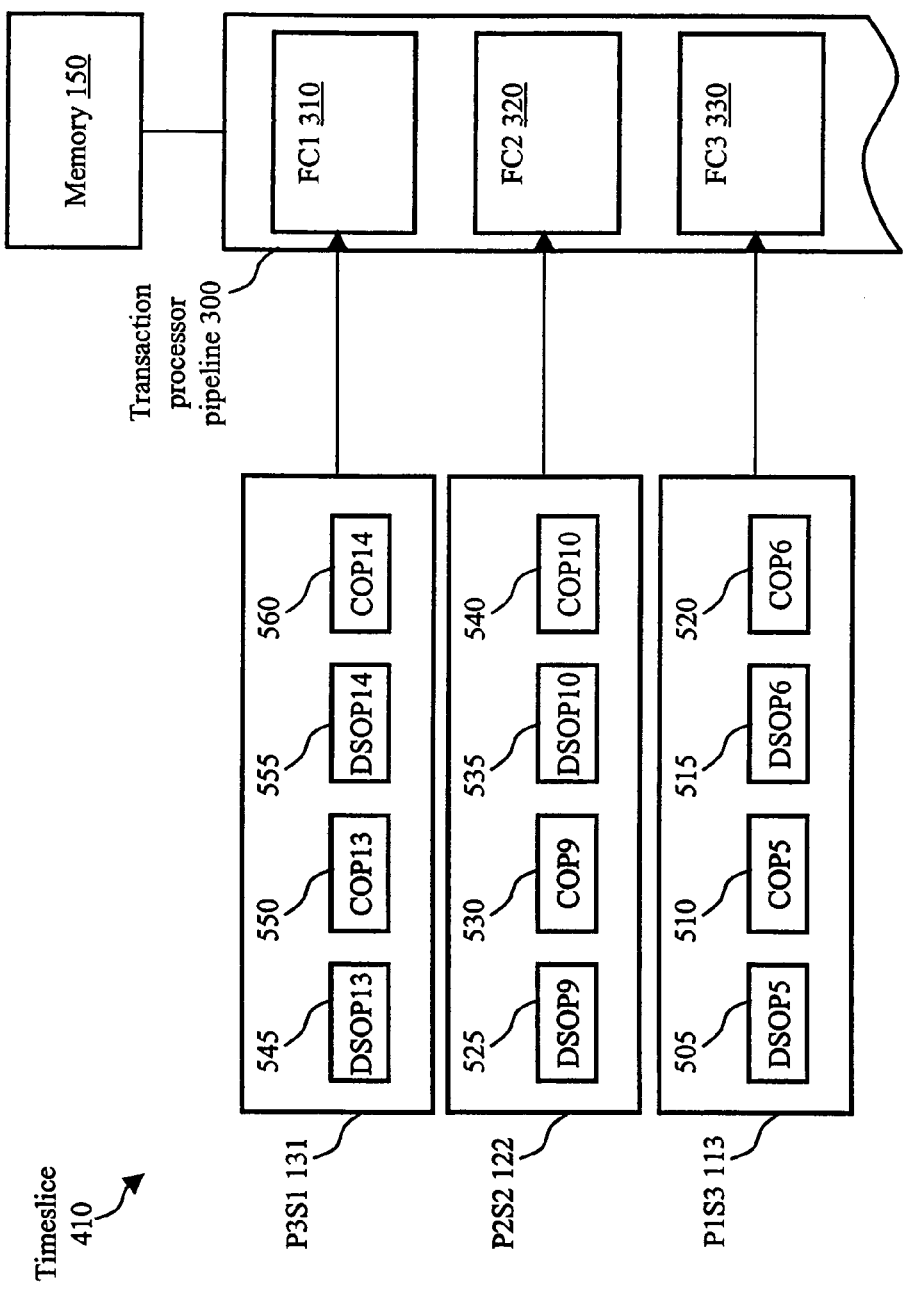
FIG. 5 further demonstrates the processing of specific subtasks by associated function controllers in a transaction processor pipeline.
Figure 6:
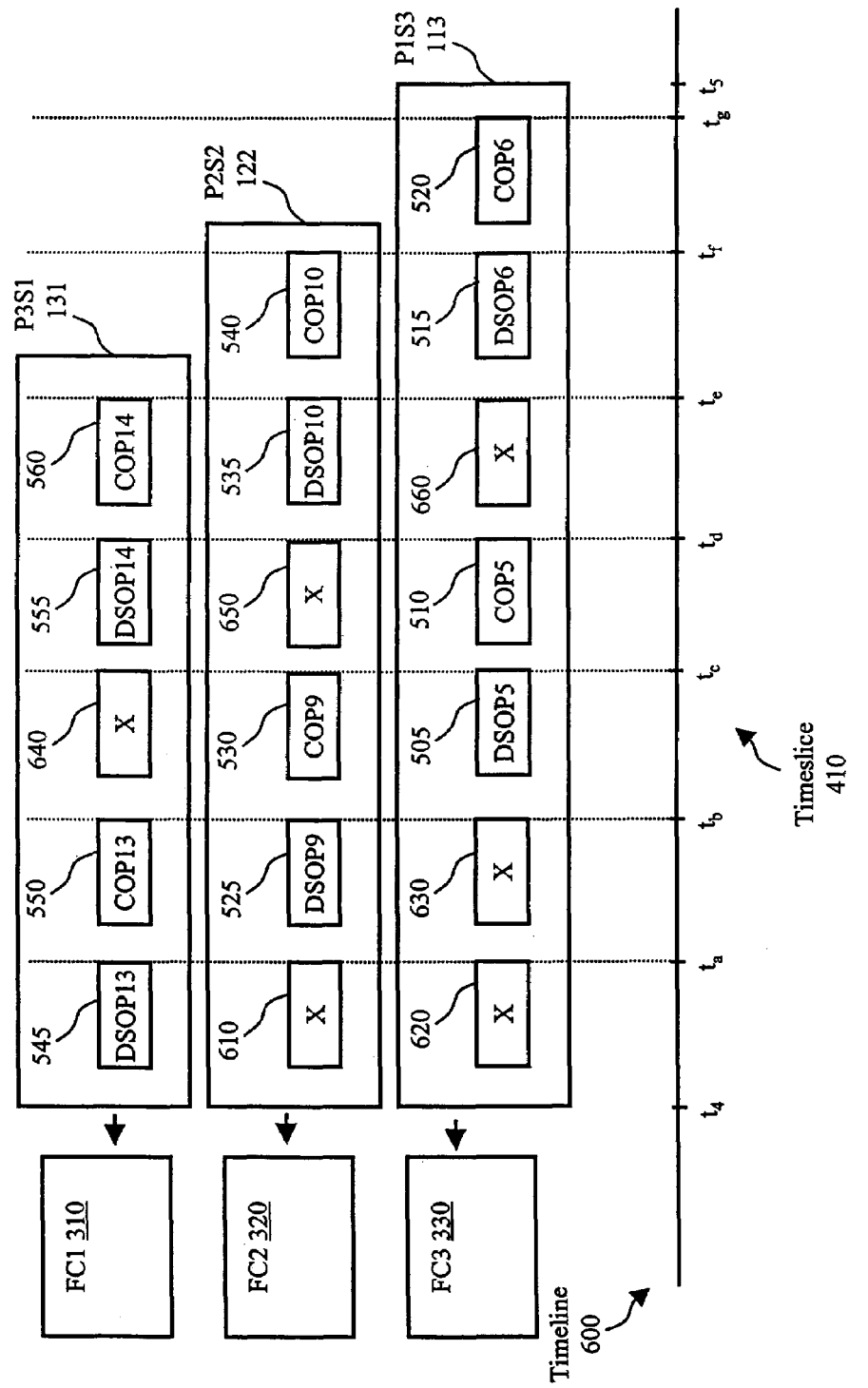
FIG. 6 shows a timeline that includes the wait states for the parallel transaction processor pipeline.

FIG. 5 shows a detailed graphic of time slice 410 from $t_4$ to $t_5$, which includes P3S1 131, P2S2 122, and P1S3 113. P1S3 113 further includes a DSOP5 505, a COP5 510, a DSOP6 515, and a COP6 520. P2S2 122 further includes a DSOP9 525, a COP9 530, a DSOP10 535, and a COP10 540. P3S1 131 further includes a DSOP 13 545, a COP13 550, a DSOP14 555, and a COP14 560. As previously described, FC1 310 processes P3S1 131 while FC2 320 processes P2S2 122 and FC3 330 processes P1S3 113 simultaneously. DSOP5 505, DSOP6 515, DSOP9 525, DSOP10 535, DSOP13 545, and DSOP14 555 all require access to memory 150 for processing because they are data structure operations whose data structures physically reside in memory 150. The compute operations, on the other hand, can be processed by the function controllers themselves with little or no access to memory 150. Although this embodiment has advantages over conventional systems, there is a memory bottleneck. FIG. 6 illustrates the bottleneck in memory 150 in more detail.

FIG. 6 shows a timeline 600, which includes another detailed look at timeslice 410. At $t_4$, FC1 310 begins processing DSOP13 545. DSOP13 545 requires access to memory 150. Since DSOP9 525 and DSOP5 505 also require access to memory 150 and memory 150 is busy with DSOP13 545, both FC2 320 and FC3 330 experience a stall cycle 610 a stall cycle 620, respectively, while waiting for access to memory 150. After the completion of DSOP13 545 at time $t_a$, memory 150 is free to process the next data structure operation, DSOP9 525. For simplicity, there is no priority given to data structure operations in this example; however, a priority scheme may be employed by one skilled in the art. While memory 150 is processing DSOP9 525, FC3 330 is waiting in another stall cycle 630 for access to memory 150. At time $t_b$, DSOP9 525 is completed and FC3 330 begins processing DSOP5 505. Meanwhile, FC1 310 has processed COP13 550 by time $t_b$ and begins waiting in a stall cycle 640 for DSOP5 505 to be completed, allowing access to memory 150. At time $t_c$, FC3 330 has completed DSOP5 505; control of memory 150 is given to FC1 310 for processing DSOP14 555. Also by time $t_c$, FC2 320 has finished processing COP9 530. FC2 320 then enters a stall cycle 650 until it can commence processing DSOP10 535. Meanwhile, at time $t_d$, FC3 330 has processed COP5 510 and FC1 310 has completed DSOP14 555. At time $t_e$, FC1 310 has processed the final operation COP14 560, giving FC2 320 access to memory 150 for processing DSOP10 535. FC3 is in a stall cycle 660 waiting for DSOP10 535 to be completed. At time $t_e$, DSOP10 535 completes and FC3 330 begins to process DSOP6 515. FC2 320 completes its final compute operation COP10 540 at time $t_f$. Finally, FC3 330 completes processing COP6 233 at time $t_5$, thus ending timeslice 410. In conclusion, the bottleneck at memory 150 causes stall cycles in transaction processor pipeline 300 that are inefficient and slow the overall system throughput. The following figure shows a solution to the memory 150 bottleneck issue that greatly improves overall system performance.

Figure 7:
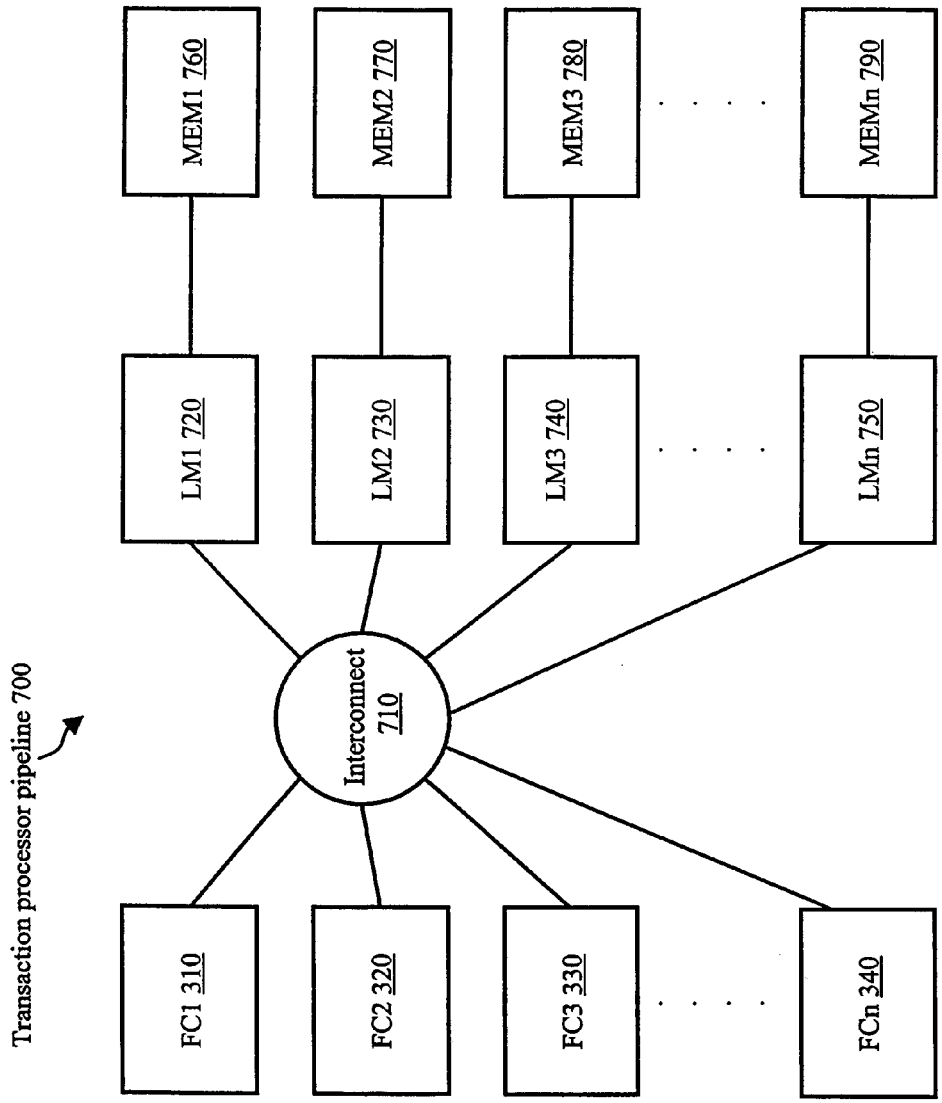
FIG. 7 shows a block diagram of a second preferred embodiment for the transaction processor pipeline of the present invention.

FIG. 7 illustrates a second embodiment of the present invention, a transaction processor pipeline 700 that includes FC1 310, FC2 320, FC3 330, and FCn 340. Transaction processor pipeline 700 also includes an interconnect 710, a list manager 1 (LM1) 720, a list manager 2 (LM2) 730, a list manager 3 (LM3) 740, and a list manager n (LMn) 750. Attached to LM1 720 is a memory 1 (MEM1) 760. Attached to LM2 730 is a memory 2 (MEM2) 770. Coupled to LM3 740 is a memory 3 (MEM3) 780. Coupled to LMn 750 is a memory n (MEMn) 790. List managers are dedicated processing elements. The list manager architecture is optimized for data structure operations using hardware. The data structures themselves reside in memory. Certain data structures reside in MEM1 760, others reside in MEM2 770, and still others reside in MEM3 780. There may be as many data structures as are required, located in as many memories as are required, depending on the system design. Each list manager maintains an internal table that identifies its data structure operation assignments. In other words, each data structure in the system is uniquely owned by one list manager. Additionally, physical list manager hardware can talk to different physical memory devices, and two physical list manager hardware sets can talk to the same physical memory. However, from a logical standpoint, a logical list manager may only communicate with one logically defined set of data structures. For example, LM1 720 may be responsible for processing a primary task state that may correspond to DSOP1 210. It may also be responsible for processing one cache state, which may correspond to DSOP10 535, and a second cache state that corresponds to DSOP13 545. Likewise, LM2 730 may be responsible for a particular collection of volume settings, including configuration, enablement, maximum LBA, mapping, etc. One volume may correspond to DSOP2 212, another to DSOPS5 505, and a third to DSOP14 555. LM3 740 may have responsibility for processing one volume state data structure DSOP3 220, another volume state DSOP6 515, and a third volume state DSOP9 525.

In a traditional multi-processor environment, semaphore mechanisms are used to keep data structure operations that are requested by two different processors from overwriting each other. The list manager architecture, on the other hand, eliminates the need for semaphores because each list manager has its own unique set of data structures. If two function controllers request the same data structure, one request will arrive first and the list manager processes the request. After the first request completes, the list manager then processes the next request. In this case, it happens to call the same data structure. A data structure may never be called simultaneously by two list managers because only one list manager controls it. All requests for a particular data structure come through only one list manager, and each list manager can only process one request at a time. Therefore, the list managers provide an automatic semaphore architecture.

Interconnect 710 is a cross-point switch, which is generally known to those skilled in the art. Interconnect 710 is responsible for routing the request packet generated by FC1 310, FC2 320, or FC3 330 to the correct list manager LM1 720, LM2 730, or LM3 740. When the list manager has completed its required data structure operation, it creates a response packet, which it then sends to interconnect 710 for routing back to the originating function controller. Each function controller element and each list manager element has an outgoing FIFO (described later in connection with FIG. 12) for sending packets and an incoming FIFO (described later in connection with FIG. 13) for receiving packets. The outgoing FIFO is required to fill up with a complete packet before sending another packet. Likewise, the incoming FIFO is required to fill up with a complete packet before receiving another packet. The flexibility of interconnect 710 allows any function controller access to any list manager within transaction processor pipeline 700 nearly simultaneously.

The following is an example packet transaction: FC1 310 is asked to process DSOP2 212, which corresponds to a data structure "A" resident in MEM2 770. FC1 310 creates a request packet using a highly optimized instruction set. Therefore, packets can be created with very few instructions in very few clock cycles. The request packet contains the name of the data structure list, in this case "A", along with other information required to process DSOP2 212. A special software tool automatically cross-references the name of the list and the operation with a destination address for the corresponding list manager and builds the request packet, in this case for LM2 730. The programmer does not need to know which list manager controls the various lists. The programmer simply uses the list name and operation that needs to be performed and the tool does the corresponding translation and packet building. This feature adds necessary flexibility to scale the solution. Since all addressing is logical, spreading location between more than one list manager becomes a simple file change. In this case, once the list is complete, FC1 310 sends the packet to interconnect 710. Interconnect 710 reads the destination address in the packet header and routes the packet to LM2 730. LM2 730 processes DSOP2 212 using the corresponding data structure in MEM2 770. When LM2 730 completes DSOP2 212, it creates a response packet, including the destination address, in this case FC1 310, and any other required information such as status or data, depending on the data structure operation request. LM2 730 then sends the completed response packet to interconnect 710, which routes the response packet to FC1 310, thus completing DSOP2 212. The list managers can send a packet and receive a packet simultaneously but they may not send and receive multiple packets simultaneously. Each list manager may process its respective data structure operations with its respectively coupled memories, simultaneously with respect to the other list managers, without causing memory bottlenecks. The list manager architecture also removes the problem of general-purpose processor architecture, which is too inefficient and slow. The list managers are better able to utilize the memory elements by increasing the memory throughput. Additionally, the data operations per second may be scaled up by adding more list managers and more list manager-associated memory. Finally, the function controllers may issue multiple data structure operations to multiple list managers simultaneously, all executing in parallel.

Figure 8:
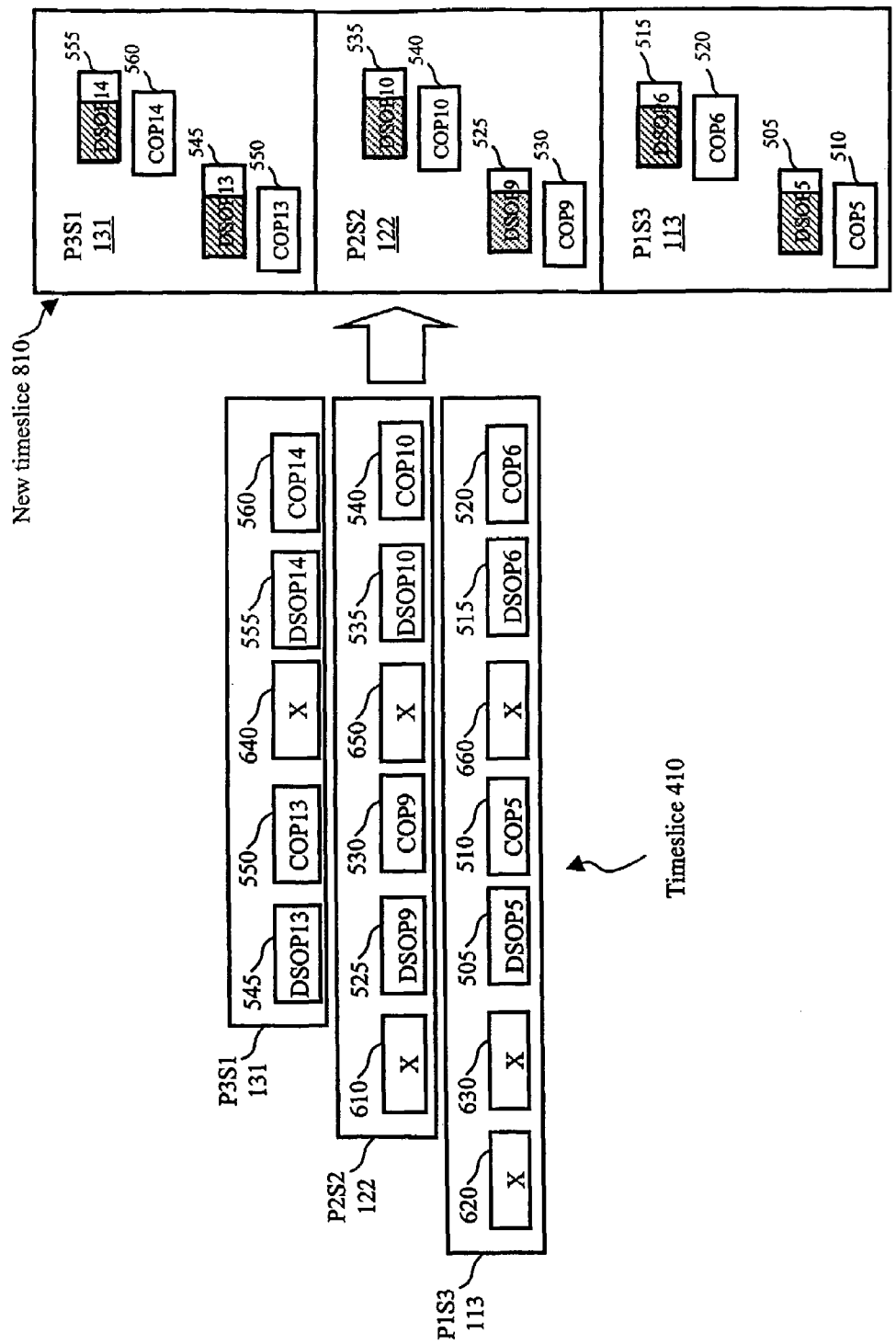
FIG. 8 illustrates the new timeline of processor throughput for the improved transaction processor pipeline.

Because multiple list managers with access to multiple memories exist and are all capable of true parallel processing, the memory bottleneck problem of the first embodiment exposed with reference to FIG. 6 is alleviated. FIG. 8 uses a timeline to illustrate this point.

FIG. 8 shows a new timeslice 810 that incorporates transaction processor pipeline 700 and compares the results with timeslice 410 previously described in connection with FIG. 6. The white areas of the subtasks are processed by the corresponding function controller, while the shaded areas of the subtasks are processed by a corresponding list manager. FC1 310 processes P3S1 131, FC2 320 processes P2S2 122, and FC3 330 processes P1S3 113. DSOP13 545 is now processed simultaneously with DSOP9 525 and DSOP5 505. Once FC1 310 completes the request packet for DSOP13 545, interconnect 710 routes the packet to LM1 720 for processing. At the same time, FC2 320 and FC3 330 complete their request packets for their respective data structure operations DSOP9 525 and DSOP5 505. Interconnect 710 then routes the request packet for DSOP9 525 to LM2 730 and the request packet for DSOP5 505 to LM3 740 for further processing. Meanwhile, FC1 310, FC2 320, and FC3 330 are processing COP13 550, COP9 530, and COP5 510, respectively. When FC1 310 completes COP13 550, it proceeds to generate another request packet for DSOP14 555 and sends the request packet to the corresponding DSOP14 555 list manager (in this case, LM2 730). Likewise, when FC2 320 finishes processing COP9 530, it begins creating a request packet for LM1 720 with information for processing DSOP10 535. Similarly, when FC3 330 finishes processing COP5 510, FC3 330 begins creating a request packet for LM3 740 with DSOP6 515 information. Interconnect 710 forwards the request packets in the order they were received to their respective destinations. While LM1 720, LM2 730, and LM3 740 process their data structure operations, FC1 310 processes COP14 560, FC2 320 processes COP10 540, and FC3 330 processes COP6 520. At the end of new timeslice 810, all subtasks P3S1 131, P2S2 122, and P1S3 113 are complete. In new timeslice 810, there are no stall cycles or periods of waiting for memory. Data structure operations are off-loaded to the list managers and their respective memories (shown as shaded areas) while compute operations are processed locally in their respective function controllers (shown as non-shaded areas). This is accomplished in a much shorter amount of time than was originally consumed in timeslice 410 (also shown). The process is now much faster due to the ability of the function controllers to off-load the memory-intensive processing of data structure operations to separate list manager devices.

Figure 9A:
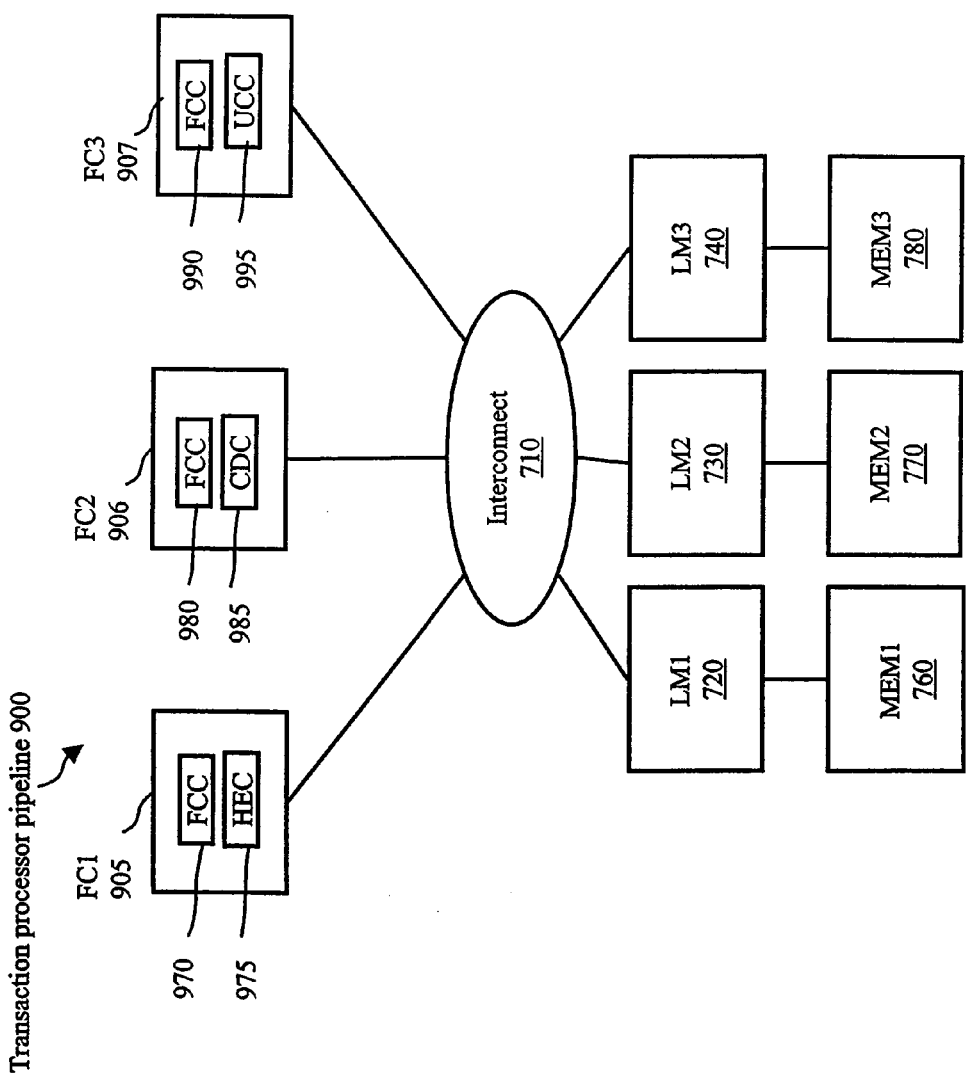
FIG. 9A shows a third preferred embodiment of a transaction processor pipeline of the present invention.

FIG. 9A shows a third preferred embodiment of a transaction processor pipeline 900 in which the individual function controllers have been augmented with dedicated hardware to perform the specific category of subtasks assigned to each controller. These hardware augmentations may include, but are not limited to, accelerated hardware implementations of specific algorithms, data interface and routing circuits, and additional high-speed dedicated memory. In this illustration, each function controller includes a functions controller core (FCC) and some block of subtask category-specific hardware. An FC1 905 includes a function controller core (FCC) 970 and a host interface logic core (HEC) 975. HEC 975 is the additional hardware logic that optimizes the processing for the host interface subtasks. HEC 975 replaces a conventional software or firmware algorithm with its hardware equivalent. An FC2 906 includes an FCC 980 and a command decode logic core (CDC) 985. CDC 985 is the additional hardware used to optimize command decode subtask processing. An FC3 907 includes an FCC 990 and a cache logic core (UCC) 995. UCC 995 is the additional hardware that optimizes processing of cache logic subtasks.

FCC 970, FCC 980, and FCC 990 represent the basic functional core building blocks. The core may consist of any number of general-purpose processor core architectures generally known to one skilled in the art. HEC 975 is used for demonstrative purposes in this example as a host interface controller, but may be any type of optimized logic core. Additionally, CDC 985 and UCC 995 are also example cores; however, they may be replaced with any type of logic core or additional logic. In summary, each function controller has the basic building block FCC and is further optimized with additional logic to aid in subtask-level processing.

Figure 9B:
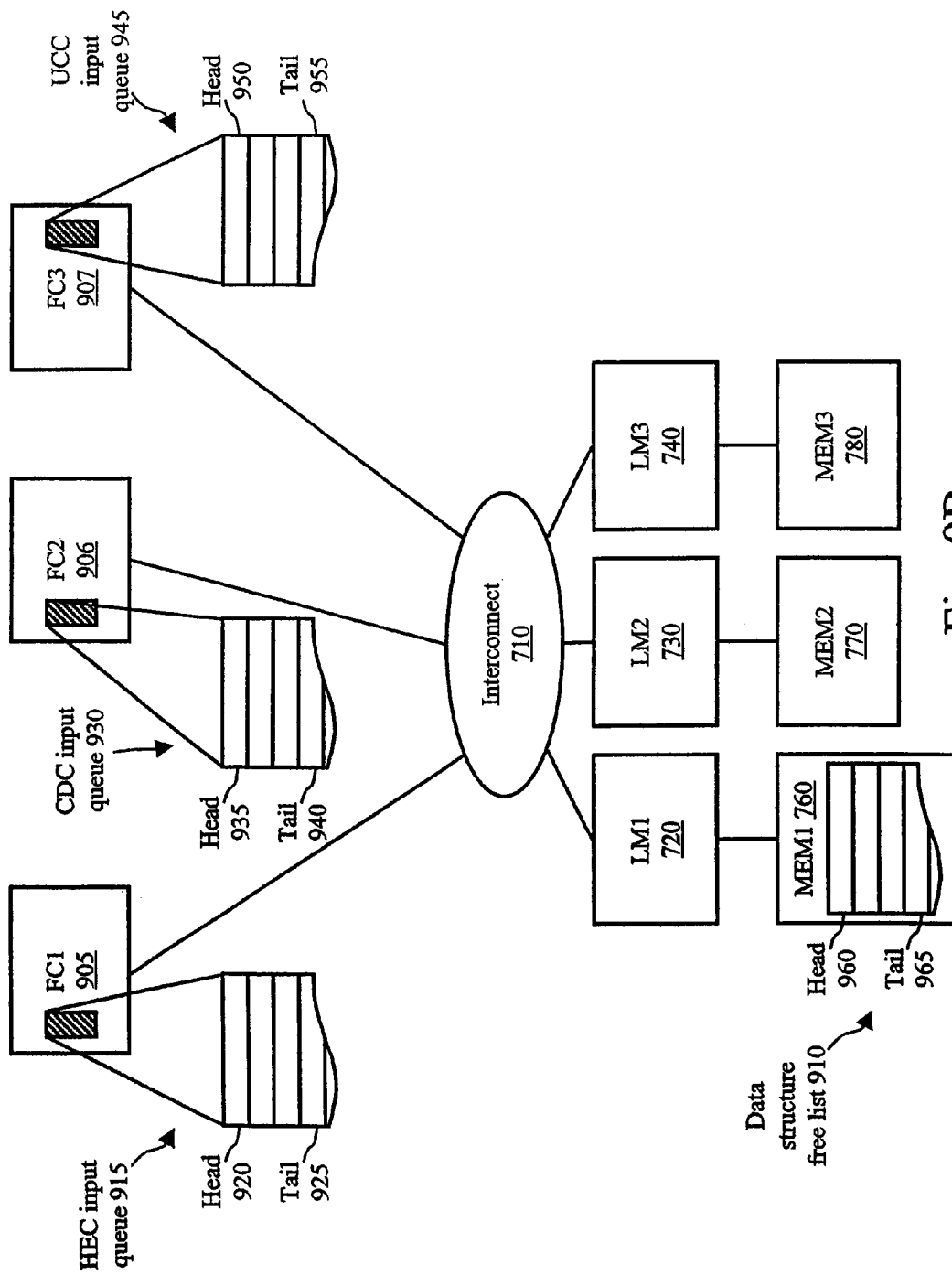
FIG. 9B is an expanded view of the transaction processor pipeline of FIG. 9A to illustrate an example transaction request for a read cache hit operation.

FIG. 9B expands the view of transaction processor pipeline 900 to illustrate an example transaction request for a read cache hit operation. Transaction processor pipeline 900 now further includes a data structure free list 910 that resides in MEM1 760, which is controlled by LM1 720. In this example, FC1 905 is a function controller optimized for host exchange subtasks that includes a HEC input queue 915 that has a head 920 and a tail 925. FC2 906 is a function controller optimized for command decode that includes a CDC input queue 930 with a head 935 and a tail 940. Furthermore, FC3 907 is a function controller optimized as a cache controller (UCC) with a UCC input queue 945 having a head 950 and a tail 955. Data structure free list 910 further includes a head 960 and a tail 965.

In this example, primary task 110 enters FC1 905 as, for example, a fibre channel frame containing a host command for a cache read. FC1 905 creates a request packet to LM1 720 and requests to have primary task 110 added to head 960 of data structure free list 910. LM1 720 then moves primary task 110 to tail 940 of a CDC input queue 930, which resides in FC2 906. As FC2 906 continues to process the elements in CDC input queue 930, primary task 110 eventually moves up CDC input queue 930 to head 935. After decoding primary task 110, FC2 906 creates a request packet to place primary task 110 on tail 955 of UCC input queue 945. UCC input queue 945 resides in FC3 907. FC3 907 continues to process elements in UCC input queue 945 until primary task 110 reaches head 950 of UCC input queue 945. Since FC3 907 is the cache controller, it performs the necessary cache read in conjunction with data structure operations performed by LM3 740, for example. Once the read operation is complete, LM3 740 sends the results back to FC1 905.

Figure 10:
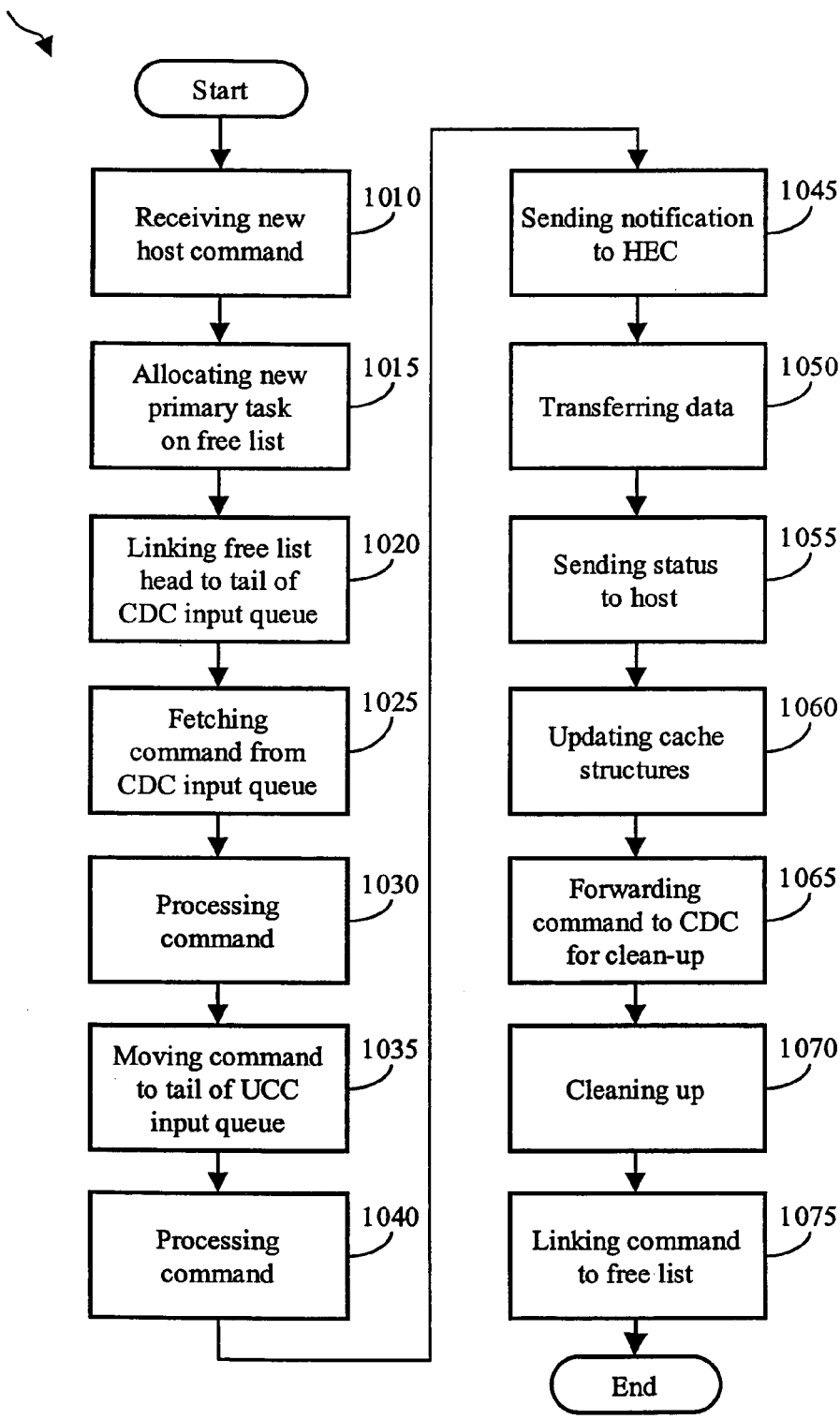
FIG. 10 is a flow diagram illustrating the read cache hit operation from FIG. 9B.

FIG. 10 is a flow diagram illustrating the example read cache hit request described with reference to FIG. 9B. FIG. 10 shows a read cache hit method 1000.

Step 1010: Receiving New Host Command

In this step, FC1 905 receives the read cache request from a transaction requester. Method 1000 proceeds to step 1015.

Step 1015: Allocating New Primary Task on Free List

In this step, FC1 905 translates the transaction request into a request packet for LM1 720 that asks LM1 720 to create primary task 110 at head 960 of data structure free list 910. Once the packet is complete, it is routed through interconnect 710 to LM1 720. In this example, LM1 720 controls data structure free list 910. When the request packet arrives, LM1 720 places primary task 110 in head 960 of data structure free list 910. Method 1000 proceeds to step 1020.

Step 1020: Linking Free List Head to Tail of CDC Input Queue

In this step, LM1 720 links primary task 110 to tail 940 of CDC input queue 930. As FC2 906 continues to process tasks in CDC input queue 930, eventually primary task 110 occupies head 935 of CDC input queue 930. Method 1000 proceeds to step 1025.

Step 1025: Fetching Command from CDC Input Queue

In this step, FC1 905 fetches primary task 110 from head 935 of CDC input queue 930. Method 1000 proceeds to step 1030.

Step 1030: Processing Command

In this step, FC2 906 proceeds to decode primary command 110 into its respective compute and data structure operations. Method 1000 proceeds to step 1035.

Step 1035: Moving Command to Tail of UCC Input Queue

In this step, FC2 906 generates a request packet to LM1 720 asking to have primary task 110 moved to tail 955 of UCC input queue 945. LM1 720 receives the request packet and links primary task 110 onto tail 955 of UCC input queue 945. Method 1000 proceeds to step 1040.

Step 1040: Processing Command

In this step, FC3 907 continues to process the commands in UCC input queue 945. Eventually primary task 110 occupies head 950 of UCC input queue 945. FC3 907 fetches the command from UCC input queue 945 and begins to process the read cache command. FC3 907 generates request packets as needed to the corresponding list manager for cache data structure operations, in this case, LM3 740. Method 1000 proceeds to step 1045.

Step 1045: Sending Notification to HEC

In this step, the read cache hit operation is complete and LM3 740 generates a response packet to HEC FC1 905 to announce that the data is ready for transfer to the requesting host. Method 1000 proceeds to step 1050.

Step 1050: Transferring Data

In this step, FC1 905 generates a DMA request to a DMA controller in order to transfer the cache read data back into the requesting host's register space. Method 1000 proceeds to step 1055.

Step 1055: Sending Status to Host

In this step, the DMA data transfer to the host is completed. FC1 905 generates a status frame and sends it to the requesting host to notify it that the data requested is available. FC1 905 then informs UCC FC3 907 that the cache segment is no longer in use. Method 1000 proceeds to step 1060.

Step 1060: Updating Cache Structures

In this step, cache controller UCC FC3 907 performs an update of the cache structures including LRU tags. Method 1000 proceeds to step 1065.

Step 1065: Forwarding Command to CDC for Clean-up

In this step, FC3 907 creates a packet that instructs a list manager, in one example LM2 730, to perform a clean-up operation in conjunction with CDC FC2 906. LM2 730 moves primary task 110 to tail 940 of CDC input queue 930 for cleaning up. Method 1000 proceeds to step 1070.

Step 1070: Cleaning Up

In this step, FC2 906 fetches the clean-up command from its input queue 930 and creates a packet that instructs LM2 730 to update volume and host status and statistics. Method 1000 proceeds to step 1075.

Step 1075: Linking Command to Free List

In this step, LM2 730 links primary task 110 to tail 965 of data structure free list 910, which de-allocates the memory that holds primary task 110. Method 1000 ends.

The transaction processor pipeline 700 relies heavily on packet communication, as can be seen in the above example. Therefore, any improvements to the packet creation and decoding process greatly improve the overall performance of the system. Several packet creation, transfer, and reception improvements are discussed below.

Firstly, the incoming packet processing and outgoing packet FIFO enable rapid succession of multiple request and response packets from any transmitter to any receiver in the system. Once a complete packet has been generated, it is sent to its final destination immediately. As the next packet in the queue is completed, it is also sent. In this manner, a pipelined outgoing request packet FIFO can send complete packets one right after the other, and the function controller is free to process any compute instructions while waiting for the response packets to return. Secondly, multi-channel packet response logic enables function controllers to send out more than one request packet at a time on different channels and keep track of the results coming back as response packets based on their channel number. This architecture allows for a nearly parallel system of sending and receiving packets. Finally, various optimized instructions for creating packets and processing response packets as well as special messaging schemes have been developed to further improve the process.

Figure 11A:
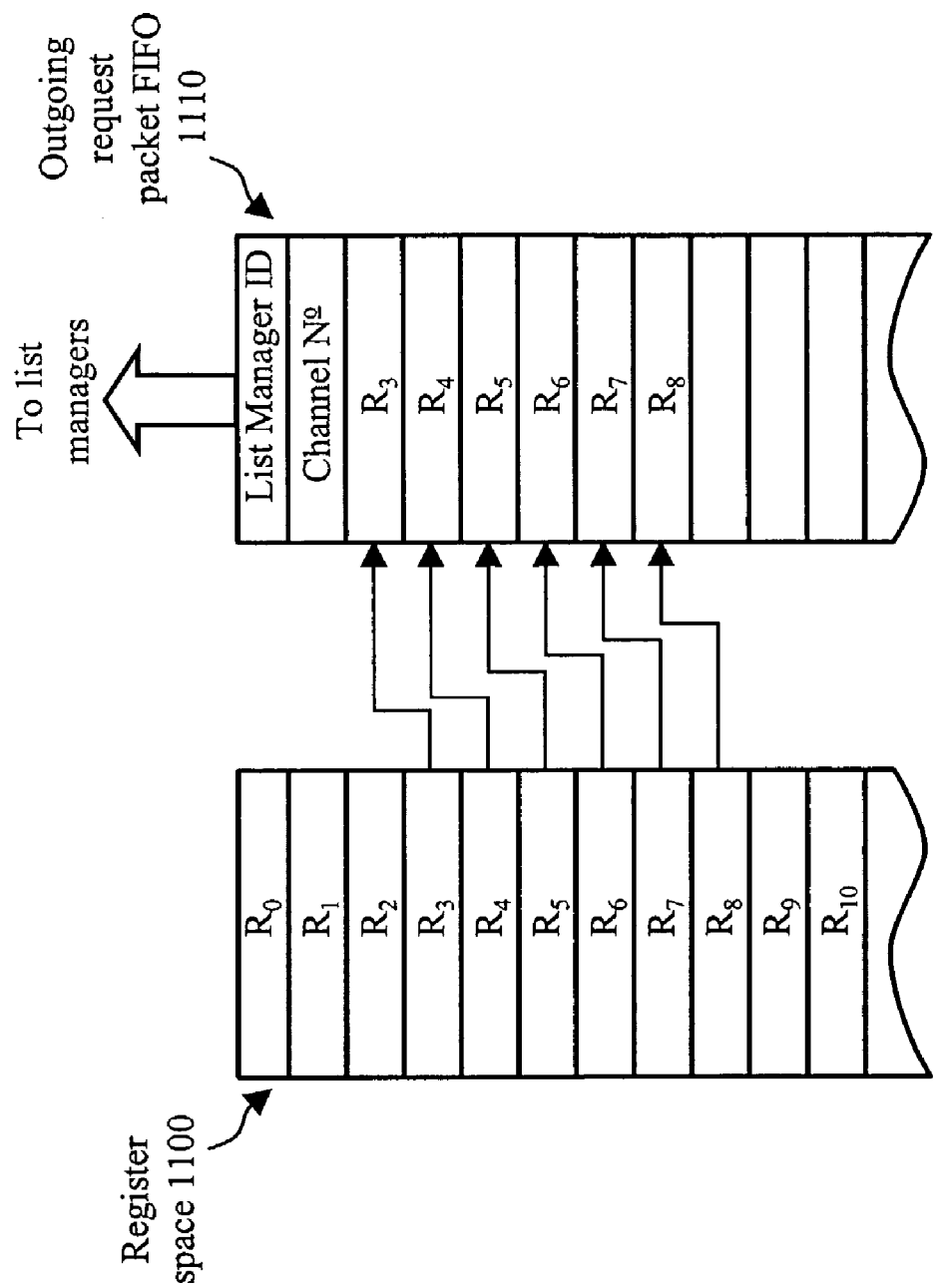
FIG. 11A shows a logical view of a sample move multiple instruction using a range of registers.
Figure 11B:
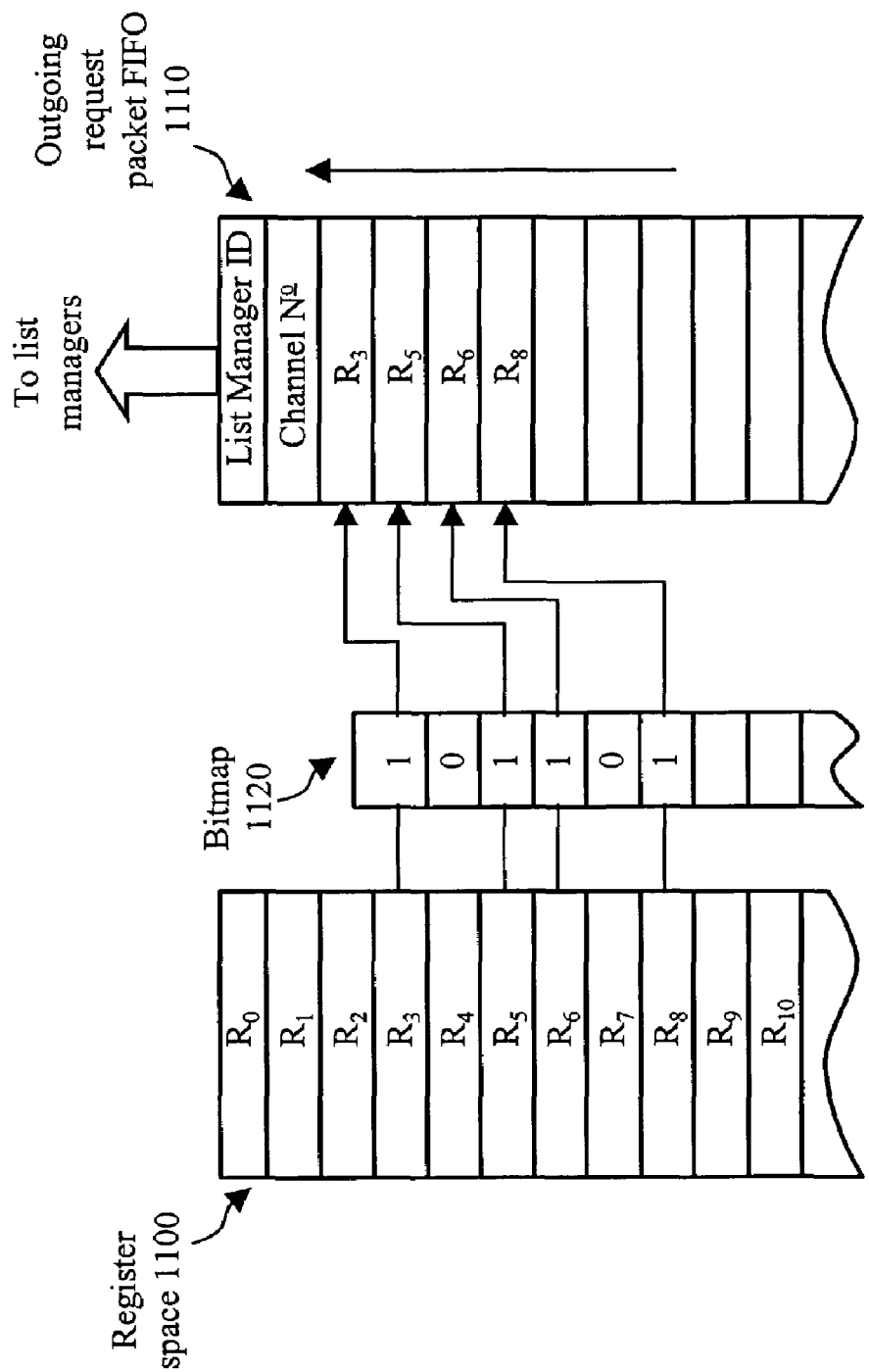
FIG. 11B shows a logical view of a sample move multiple instruction using a bitmap.

FIGS. 11A and 11B illustrate the move multiple optimized instruction set for assisting in creating request packets efficiently. Using the move multiple command, the function controller may very quickly create a request packet and send it through interconnect 710 to the correct list manager. There are two types of move multiple commands. The first is shown in FIG. 11A as a move multiple request by range. FIG. 11A shows a register space 1100 that resides in a function controller for this example. Register space 1100 comprises various registers. For simplicity, only $R_0$–$R_{10}$ are shown. An outgoing request packet FIFO 1110 is a FIFO that holds packet information sent to the various list managers. Outgoing request packet FIFO 1110 waits until the packet is complete before sending. The packets must be formed with the correct list manager identification, an associated channel number (so the sending function controller can manage the returning response packets), and a series of data from register space 1100. In this example, the range move multiple command "move mult R3, 6→packet FIFO" translates into the addition of $R_3$, $R_4$, $R_5$, $R_6$, $R_7$, and $R_8$ to outgoing packet FIFO 1110. The first parameter $R_3$ is the starting register and the value 6 is the total number of consecutively sequential registers to add to the FIFO packet.

FIG. 11B shows an alternative move multiple command using a bitmap. In this example, the move multiple command is "move mult R3, 101101→packet FIFO". The $R_3$ register is again the starting register. The binary digit 101101 represents the bitmap and corresponds to overlaying a bitmap 1120 from register $R_3$. The results are the addition of $R_3$, $R_5$, $R_6$, and $R_8$ to outgoing request packet FIFO 1110.

Figure 12A:
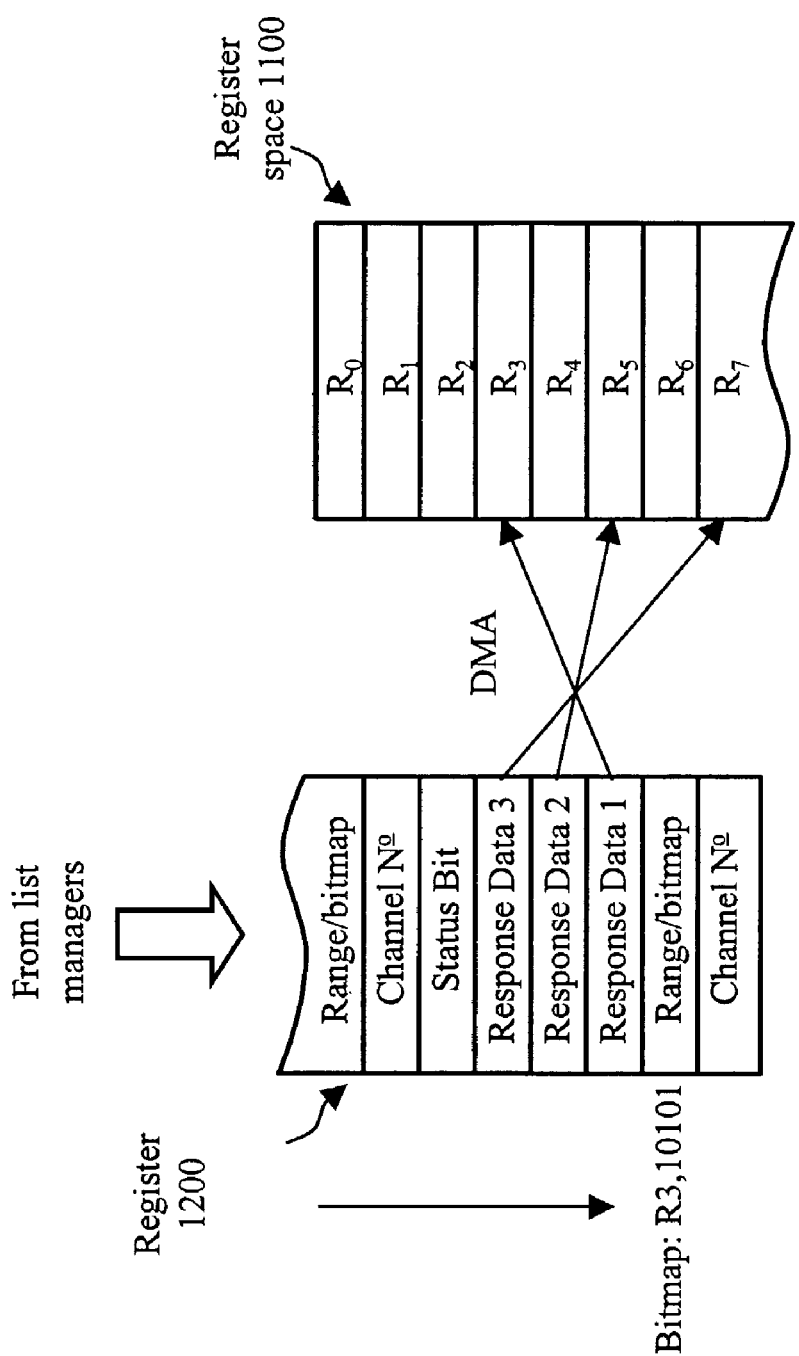
FIG. 12A shows a logical view of an incoming response packet and its DMA capabilities.
Figure 12B:
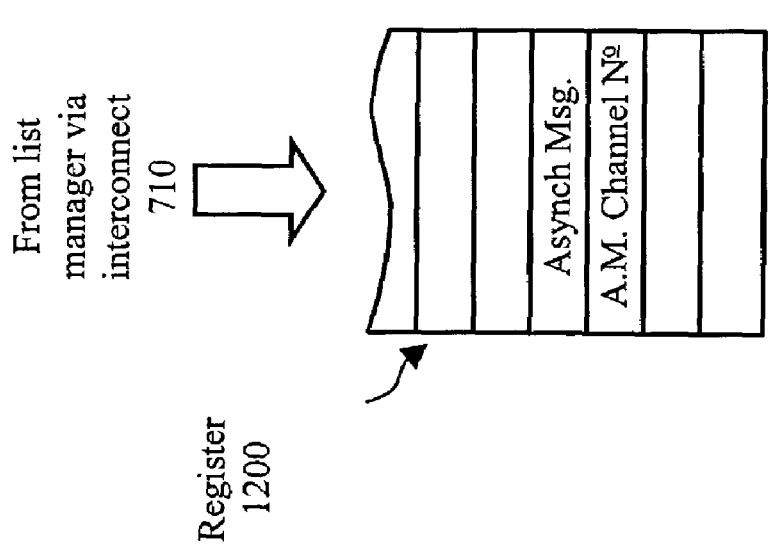
FIG. 12B shows a logical view of an asynchronous messaging response packet.

FIGS. 12A and 12B show some examples of the optimized response packet logic. Response packets are generated from the list managers to the function controllers to send requested data or status or both. The response packets have been optimized in such a way that the requesting function controller loses few or no processing cycles when incoming response packets arrive.

FIG. 12A shows a response packet programmed with bitmap and starting address an in register 1200. In this example, the response packet contains the channel number for the request, the move multiple command, some response data 1, 2, and 3, as well as a status bit. The next response packet is seen beginning to fill up the end of incoming register 1200. The response packet is optimized to perform DMA writes into the corresponding registers in register space 1100 without function controller intervention. The receiving function controller is free to continue processing without using compute cycles to move the data from incoming packet FIFO to register space 1100. In this example, response data 1 is written to $R_3$, response data 2 is written to $R_5$, and response data 3 is written to $R_7$. The status bit instructs the function controller any information regarding the operation that was performed (e.g., if any errors occurred).

FIG. 12B shows another type of special response packet called an asynchronous message. The messages may arrive at any time and are not tied to a particular clock cycle or regulated event, such as a polling cycle. The asynchronous message has a reserved channel number so that function controllers can distinguish it from another type of response packet. Asynchronous messaging is used to notify function controllers of changes in the system without the function controllers having to poll the system. For example, asynchronous messages may be used to inform a function controller of a new element waiting at the head of its input queue, or to tell it that the head of its input queue is empty. The asynchronous message contains a list of bits that should be set or cleared by the receiving function controller. For example, when a list manager has moved a task onto the function controller's input queue, the list manager sends an asynchronous message to the function controller that instructs it to set the bit that corresponds to adding another task to its input queue. Another example is an asynchronous message that instructs the function controller to clear a bit corresponding to completing a task, such as a data structure operation. When the list manager completes the requested data structure operation, it sends an asynchronous message to the function controller instructing it to clear the bit corresponding to the operation since it is now completed. Asynchronous messaging is much more efficient and less time consuming than polling and therefore, improves system performance.

Figure 13:
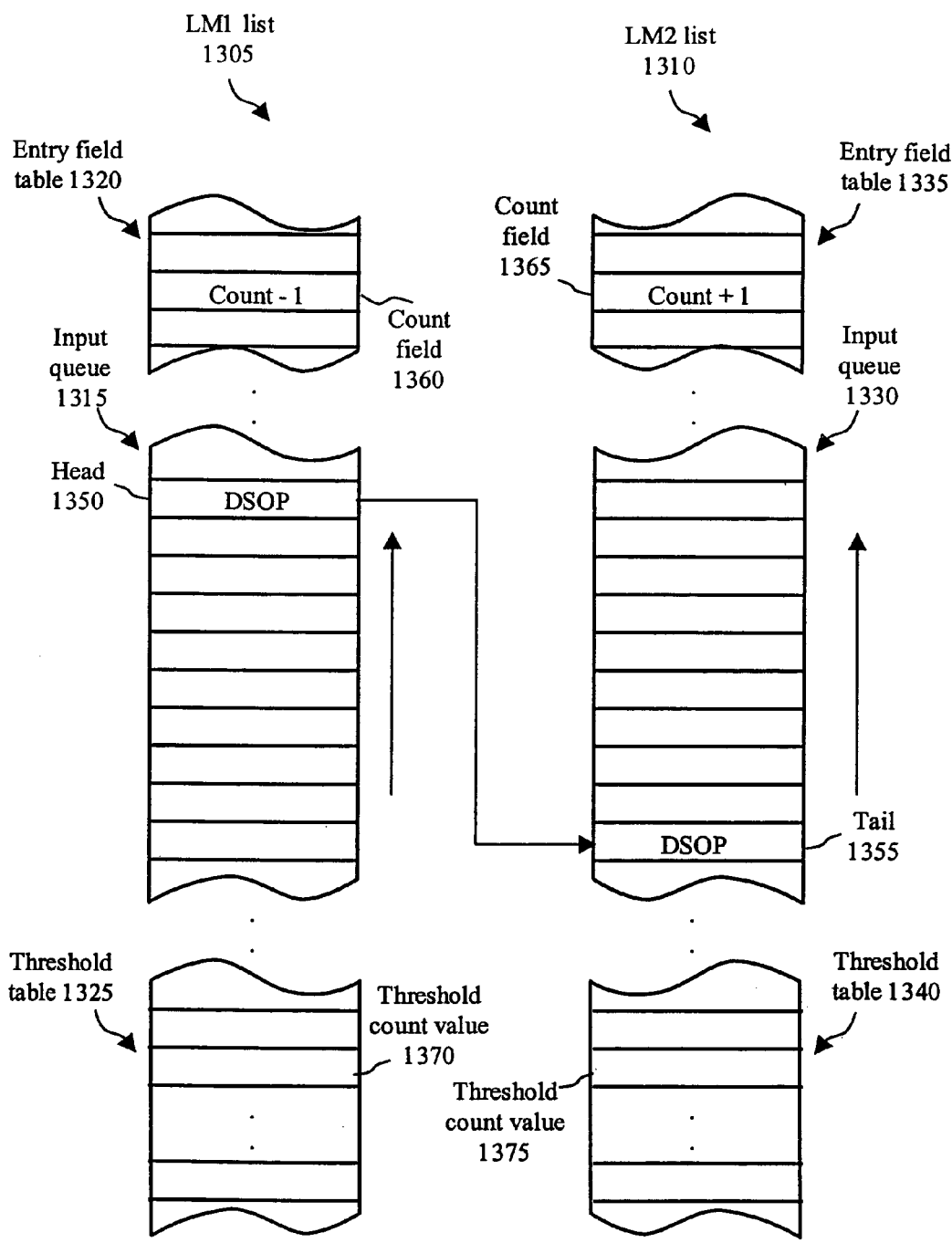
FIG. 13 is a logical view of two lists in the transaction processor pipeline system, including input queues, entry field tables, and threshold tables.

FIG. 13 shows a logical diagram of two separate lists. An LM1 list 1305 is controlled by LM1 720, and an LM2 list 1310 is controlled by LM2 730 in this example. LM1 list 1305 includes an input queue 1315, an entry field table 1320, and a threshold table 1325. LM2 list 1310 includes an input queue 1330, an entry field table 1335, and a threshold table 1340. In this example, LM1 720 is commanded to move a task 1345 from a head 1350 of input queue 1315 to a tail 1355 of input queue 1330. In so doing, LM1 720 decrements the count in a count field 1360 of entry field table 1320. List 1305 is considered the source in this case. At the same time, LM2 730 increments a count field 1365 in entry field table 1335. List 1310 is considered the target in this case. At this point, LM1 720 compares the value in count field 1360 with a threshold count value 1370 in threshold table 1325. The comparison may be a greater than, less than, equal to, not equal to, or some other logical comparison, depending on the desired results. If the comparison is within threshold tolerances, LM1 720 continues its normal processing. If, however, the comparison yields a value that is outside of tolerance, LM1 720 responds accordingly. For example, LM1 720 may send an asynchronous message to a function controller to announce that input queue 1315 is empty. Similarly, LM2 730 compares count field 1365 with a threshold count value 1375 in threshold table 1340. If the value is outside of the threshold range, LM2 730 may send an asynchronous message to another function controller notifying it that input queue 1330 is no longer empty. There is a unique threshold table maintained per list in transaction processor pipeline 700. These threshold lists can be useful not only for maintaining input queues, but also for identifying when the threshold for dirty cache has been reached so the function controller may then flush the cache.

Figure 14:
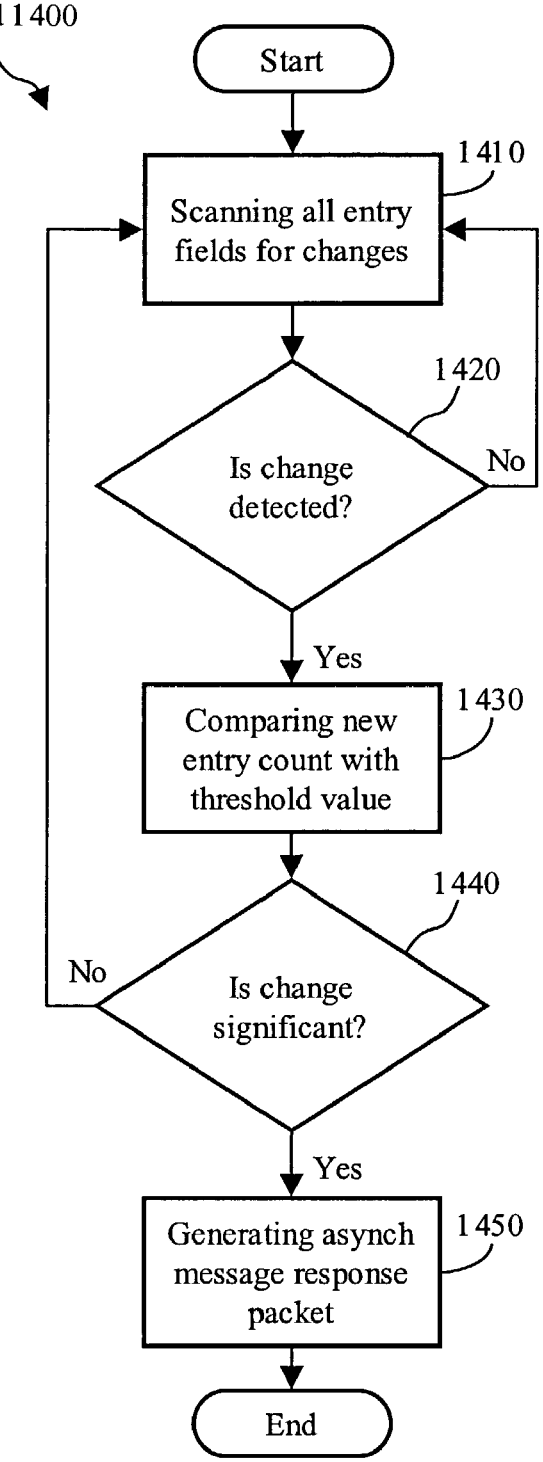
FIG. 14 is a flow diagram outlining the threshold comparison procedure used by the list managers.

FIG. 14 is a flow diagram of a threshold comparison method 1400 using LM1 720 as an example.

Step 1410: Scanning All Entry Fields for Changes

In this step, LM1 720 looks at all of the entry fields in entry field table 1320 to determine if there have been any changes since the last scan. Method 1400 proceeds to step 1420.

Step 1420: Is Change Detected?

In this decision step, LM1 720 compares the last entry field list with the current entry field list to determine if there are any differences. If yes, method 1400 proceeds to step 1430; if no, method 1400 returns to step 1410.

Step 1430: Comparing New Entry Count with Threshold Value

In this step, LM1 720 compares the value in count field 1360 in entry field table 1320 with the corresponding threshold count value 1370. Method 1400 proceeds to step 1440.

Step 1440: Is Change Significant?

In this decision step, LM1 720 determines if the value in count field 1360 is out of acceptable threshold range. If yes, method 1400 proceeds to step 1450; if no, method 1400 returns to step 1410.

Step 1450: Generating Asynch Message Response Packet

In this step, LM1 720 generates an asynchronous response packet with the correct channel ID for asynchronous messages and the corresponding bit information. Once the response packet is complete, it is sent to the corresponding function controller. Method 1400 ends.

Figure 15:
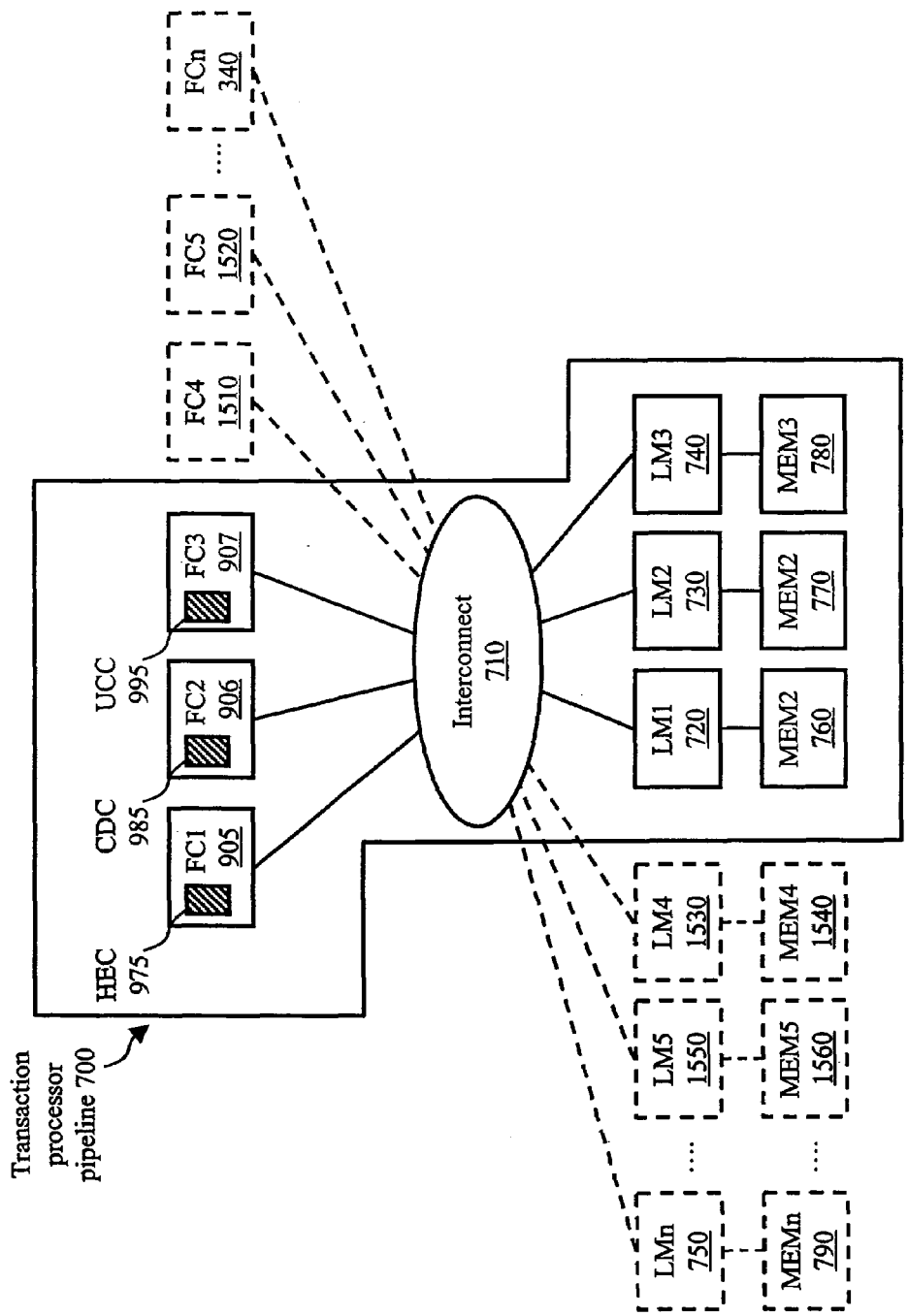
FIG. 15 demonstrates the scalability of the transaction processor pipeline system.

Scalability is another advantage that transaction processor pipeline 700 has over conventional systems. FIG. 15 shows transaction processor pipeline 700 with three function controllers FC1 905, FC2 906, and FC3 907. Each of these function controllers has been optimized using hardware to greatly increase its performance on specific tasks. For example, FC1 905 has been optimized with HEC 975. FC2 906 has been optimized with CDC 985, and FC3 907 has been optimized with UCC 995. During operation, it may become apparent that more compute operations than data structure operations are required. These additional compute operations may not have corresponding optimized hardware. In this case, the transaction processor architecture of the present invention allows the addition of more function controllers, such as an FC4 1510, an FC5 1520, and so on up to FCn 340. Each new function controller may have optimized hardware to perform certain types of compute operations, or they may simply contain the basic function controller core. Since, in this example, no data structure operation bottlenecks were apparent in the system, it is not necessary to add additional list managers and corresponding memory to the scaled system.

If, on the other hand, the data structure operations become the bottleneck in the system, rather than the compute operations, more list managers, such as an LM4 1530, an LM5 1550, and so on up to LMn 750, and associated memory, such as a MEM4 1540, and a MEM5 1560, respectively, and so on up to MEMn 790, may be added to take on the additional load without adding function controllers. The ability to add only the hardware required to run the system efficiently greatly reduces unnecessary hardware costs.

The flexibility of the transaction processor provides the ability to change the processing power of the transaction processing architecture based on the application. For compute-intensive applications, function controllers can be added to the architecture; for data structure-intensive applications, list managers and memory can be incorporated into the system as necessary. This flexible system also provides the ability to adapt to changes in bus and transmission technology. The system achieves optimal performance through load or path balancing. In some cases, moving a certain subtask to another function controller may provide better throughput results. Faster processors, function controllers, list managers, and memories can also improve overall system performance. Further optimization of hardware to perform certain tasks and changes to microcode may also help to increase performance. The transition from firmware-processed tasks to that of optimized hardware solutions performed in parallel has given the transaction processor a great advantage in speed, flexibility, and scalability over conventional transaction processors.

Figure 16:
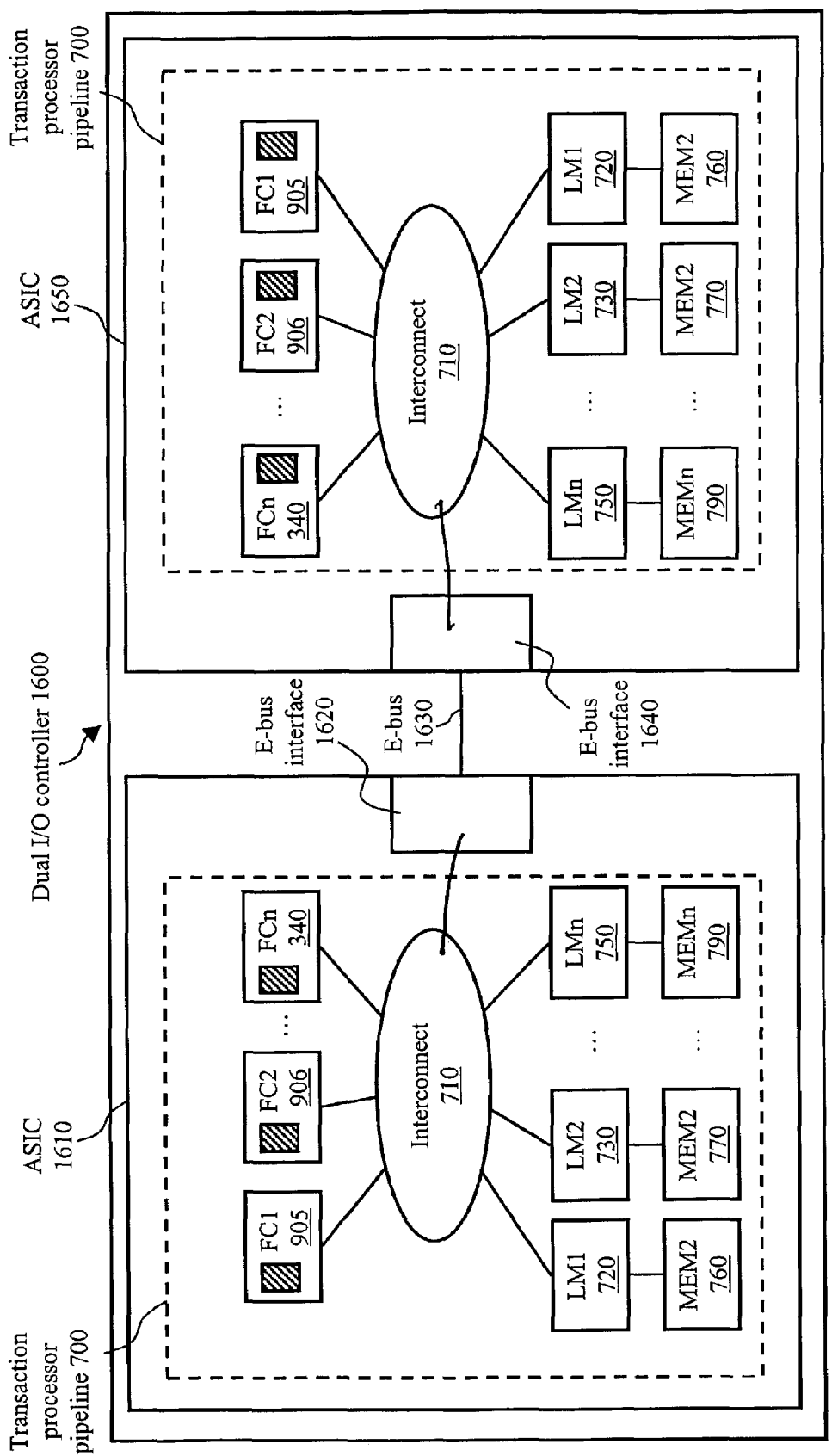
FIG. 16 shows an alternative embodiment of a scalable transaction processor pipeline of the present invention in which the transaction processor pipeline is created in an ASIC.

FIG. 16 shows an application of transaction processor pipeline 700: a dual I/O controller 1600, in which a hardware implementation of transaction processor pipeline 700 is incorporated into an ASIC 1610. ASIC 1610 also includes an e-bus interface 1620 and additional circuitry such as DRAM, interface and level shifting circuits, etc. (not shown). E-bus interface 1620 is coupled to an E-bus 1630. E-bus 1630 is also coupled to an e-bus interface 1640 that resides on an ASIC 1650 identical to ASIC 1610. The addition of e-bus intercommunication capability between the two transaction processor blocks provides an implementation that is easily scaled by simply adding another ASIC with an e-bus. There is no re-spin of the silicon required to add same function capacity to the system.

Figure 17:
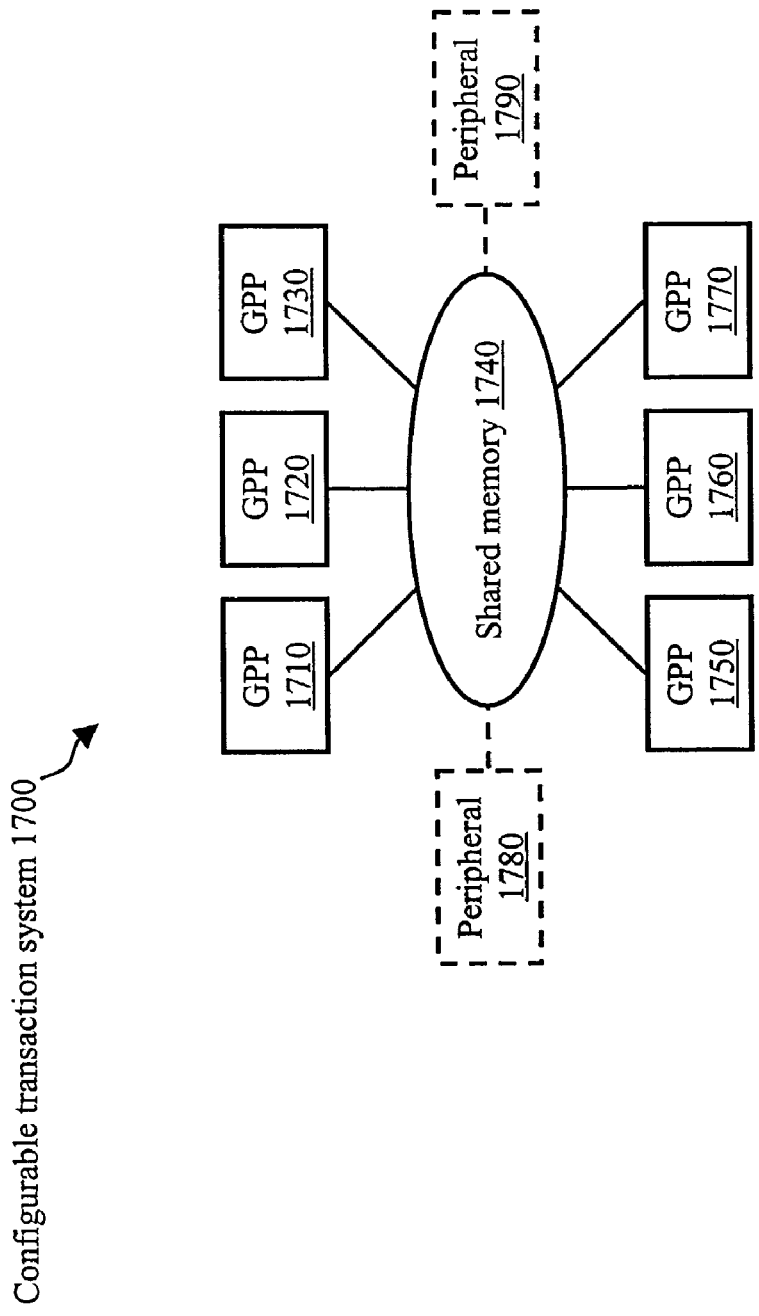
FIG. 17 shows an alternative embodiment of a transaction processor pipeline using general-purpose processors as transaction processing elements.

FIG. 17 shows a fourth alternative embodiment of transaction processor pipeline 700. This embodiment includes a configurable transaction system 1700 that further includes a general-purpose processor (GPP) 1710, a GPP 1720, a GPP 1730, a shared memory 1740, a GPP 1750, a GPP 1760, and a GPP 1770. The GPPs may be any of a number of known general-purpose processor cores, for example, those based on the industry standard ARM processor architecture. In configurable transaction system 1700, GPP 1710, GPP 1730, and GPP 1720 are configured to function as function controllers and each has its own private code and data space. GPP 1750, GPP 1760, and GPP 1770 can be configured to perform list manager functions, again, each with its own code and data space. Shared memory 1740 acts as an interconnect fabric by containing various banks of memory and by moving data to and from memory banks, processor cores, and peripheral logic. A peripheral 1780 and a peripheral 1790 may also be coupled to shared memory 1740 for additional processing and/or storage power. It is also possible to add extra hardware, instruction sets, and functionality to peripheral 1780 and/or peripheral 1790 for further optimization of configurable transaction system 1700. For example, often-used or compute-intensive algorithms can be realized in hardware, connected to shared memory 1740, and made available to accelerate specific functions within any general-purpose processor. Configurable transaction system 1700 may also provide improved memory and compute bandwidth, depending on how many GPPs are added to the system and how each GPP is configured to perform. In some cases, for example, GPP 1710 may steal cycles from GPP 1720 if GPP 1710 needs the extra processing power and if it is determined that GPP 1720 is otherwise idle for those particular cycles.

This type of system may also be easily configurable on the fly using microcoded instructions. For example, GPP 1710 may be optimized to perform HEC compute operations. However, at some point, there may be no HEC compute operations to perform. After idling for a set number of cycles while gathering statistical data on the current types of compute transactions, GPP 1710 may download from shared memory 1740 the firmware instruction set for becoming a UCC function controller instead. GPP 1710 may then process UCC compute instructions until it becomes apparent that more HEC compute processing power is required, at which time GPP 1710 can revert to being a HEC controller.

Simulation tools may also be used to fully exercise the system given various applications and variable system inputs, such as loads, transaction requests, bandwidth, memory, clock speeds, interrupts, and other system demands. These tools provide the system designer with valuable information regarding how to best organize and arrange the system for optimal performance. This tool is especially useful for optimizing a system before it is produced in silicon, thus eliminating re-spin costs incurred from poor design implementation.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

The invention claimed is:

1. A method for processing transactions in a system having N function controllers, the method comprising:
   receiving a plurality of transactions, wherein each transaction comprises a plurality of subtasks, and each of the plurality of subtasks comprises a plurality of data structure operations for manipulating memory contents and a plurality of compute operations for performing processing;
   assigning to each of said N function controllers, a different one of said plurality of subtasks from said plurality of transactions;
   executing the plurality of compute operations, wherein the executing is performed by the N function controllers; and
   sending the plurality of data structure operations to a plurality of list managers in a request for execution of the plurality of data structure operations, each of the plurality of list managers configured to act on an exclusive plurality of data structures contained within a plurality of memories.

2. The method of claim 1, wherein the system is a cache, and cache data and status information are stored in the plurality of memories, and the plurality of transactions are read or write requests for another memory device.

3. The method of claim 1, wherein each of said N function controllers is responsible for performing a specific category of subtask.

4. The method of claim 1, wherein none of said N function controllers owns any particular storage volume or is responsible for executing operations on units of data within said particular storage volume.

5. The method of claim 1, wherein each of the plurality of list managers is configured to communicate with each of the N function controllers and each of the plurality of memories.

6. The method of claim 1, wherein no communication occurs between the plurality of list managers.

7. The method of claim 1, wherein no communication occurs between the N function controllers.

8. The method of claim 1, wherein the plurality of list managers process only one request at a time.

9. The method of claim 1, wherein the requests do not include semaphores.

10. A scalable system for processing a plurality of transactions, comprising:
   a plurality of function controllers;
   a memory subsystem, comprising:
   at least one memory for storing data structures; and
   at least one list manager for manipulating the contents of said memory; and
   an interconnect, coupling said plurality of function controllers with said memory subsystem;
   wherein
   each of said plurality of transactions comprise a plurality of subtasks, each subtask comprising a plurality of compute operations and a plurality of data structure operations for manipulating the contents of said memory subsystem, said plurality of subtasks from said plurality of transactions are assigned to different ones of said plurality of function controllers for execution;
   each function controller executes the plurality of compute operations from the subtask assigned from the plurality of subtasks; and
   each function controller sends at least one request to execute the plurality of data structure operations from the subtask assigned from the plurality of subtasks, the requests sent to the list manager associated with the data structure to be manipulated by the execution of the plurality of data structure operations.

11. The system of claim 10, wherein said at least one memory is a single memory and said at least one list manager is a single list manager coupled to said single memory for manipulating the contents of said single memory.

12. The system of claim 10, wherein said memory subsystem comprises N memories, and each one of said list managers is coupled to at least one of said N memories for manipulating the contents of said at least one of said N memories, wherein N is an integer greater than 1.

13. The system of claim 12, wherein said interconnect is a packet switch.

14. The system of claim 13, wherein said packet switch is a multi-channel packet switch.

15. The system of claim 12, wherein said interconnect is a shared memory.

16. The system of claim 12, wherein each of said function controllers is a general purpose processor.

17. The system of claim 12, wherein each of said function controllers includes at least one application specific processor.

18. The system of claim 17, wherein said at least one application specific processor includes a host interface controller.

19. The system of claim 17, wherein said at least one application specific processor includes a command decoder.

20. The system of claim 17, wherein said at least one application specific processor includes a cache controller.

21. The system of claim 10, wherein each of said plurality of function controllers is responsible for performing a specific category of subtask.

22. The system of claim 10, wherein the list managers are not configured to communicate with each other.

23. The system of claim 10, wherein the function controllers are not configured to communicate with each other.

24. The system of claim 10, wherein the at least one request does not include semaphores.

* * * * *